US012598542B2

(12) United States Patent
Song et al.

(10) Patent No.: US 12,598,542 B2
(45) Date of Patent: Apr. 7, 2026

(54) APPARATUS AND METHOD FOR MANAGING USER EQUIPMENT IN WIRELESS COMMUNICATION SYSTEM

(71) Applicant: SAMSUNG ELECTRONICS CO., LTD., Suwon-si (KR)

(72) Inventors: Junhyuk Song, Suwon-si (KR); Donghyeok Ho, Suwon-si (KR); Jungshin Park, Suwon-si (KR); Sangkyou Ryou, Suwon-si (KR); Chungkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 497 days.

(21) Appl. No.: 18/192,484

(22) Filed: Mar. 29, 2023

(65) Prior Publication Data

US 2023/0239776 A1 Jul. 27, 2023

Related U.S. Application Data

(63) Continuation of application No. PCT/KR2022/009682, filed on Jul. 5, 2022.

(30) Foreign Application Priority Data

Jul. 7, 2021 (KR) ........................ 10-2021-0089392

(51) Int. Cl.
*H04W 4/00* (2018.01)
*H04W 28/02* (2009.01)
*H04W 48/16* (2009.01)

(52) U.S. Cl.
CPC ....... *H04W 48/16* (2013.01); *H04W 28/0268* (2013.01)

(58) Field of Classification Search
CPC .......................... H04W 48/16; H04W 28/0268
See application file for complete search history.

(56) References Cited

U.S. PATENT DOCUMENTS

| | | | |
|---|---|---|---|
| 12,075,527 B2* | 8/2024 | Chandrashekar ....... | H04W 8/26 |
| 2021/0014912 A1* | 1/2021 | Song ...................... | H04W 8/08 |

(Continued)

FOREIGN PATENT DOCUMENTS

| | | | | |
|---|---|---|---|---|
| CN | 112752251 A | 5/2021 | | |
| EP | 3937523 A1* | 1/2022 | .............. | H04W 8/26 |

(Continued)

OTHER PUBLICATIONS

Technical Report—O-RAN, "O-Ran Working Group 2 Non-RT RIC: Functional Architecture", 2021, 53 pages.

(Continued)

*Primary Examiner* — Elisabeth Benoit Magloire
(74) *Attorney, Agent, or Firm* — Nixon & Vanderhye P.C.

(57) ABSTRACT

A 5th generation (5G) or pre-5G communication system for supporting a higher data transmission rate after a 4th generation (4G) communication system such as long-term evolution (LTE). A method performed by a non-real time (RT) radio access network (RAN) intelligent controller (RIC) in a wireless communication system, the method comprising: obtaining, from an E2 node, first information related to user equipment (UE) identity of an open (O)-RAN; obtaining, from a network exposure function (NEF) of a 5th generation (5G) core network (5GC), second information related to the UE identity; generating an A1 policy message based on the first information and the second information; and transmitting the A1 policy message to a near-RT RIC via an A1 interface.

20 Claims, 25 Drawing Sheets

(56) References Cited

U.S. PATENT DOCUMENTS

| | | | |
|---|---|---|---|
| 2021/0184989 A1 | 6/2021 | Wu et al. | |
| 2021/0204148 A1 | 7/2021 | Chou et al. | |
| 2022/0400372 A1* | 12/2022 | Cai | H04W 24/02 |
| 2022/0408242 A1 | 12/2022 | Sun | |

FOREIGN PATENT DOCUMENTS

| | | | |
|---|---|---|---|
| KR | 10-20210-007841 A | 1/2021 | |
| WO | WO 2021/010693 A1 | 1/2021 | |
| WO | WO2021048831 A1 | 3/2021 | |
| WO | 2021066587 A1 | 4/2021 | |
| WO | 2021066588 A1 | 4/2021 | |
| WO | WO2020242987 A1 | 12/2025 | |

OTHER PUBLICATIONS

Technical Specification—O-RAN, O-Ran Working Group 3 Near-Real-time RAN Intelligent Controller E2 Service Model (E2SM), RAN Function Network Interface (NI), 2020, 46 pages.
Extended European Search Report dated Oct. 17, 2024 for EP Application No. 22837936.8.
O-RAN, Working Group 2.Non-RT RIC: Functional Architecture RIC-ARCH-TR-v01.01; Jun. 30, 2021; pp. 1-52.

* cited by examiner

800

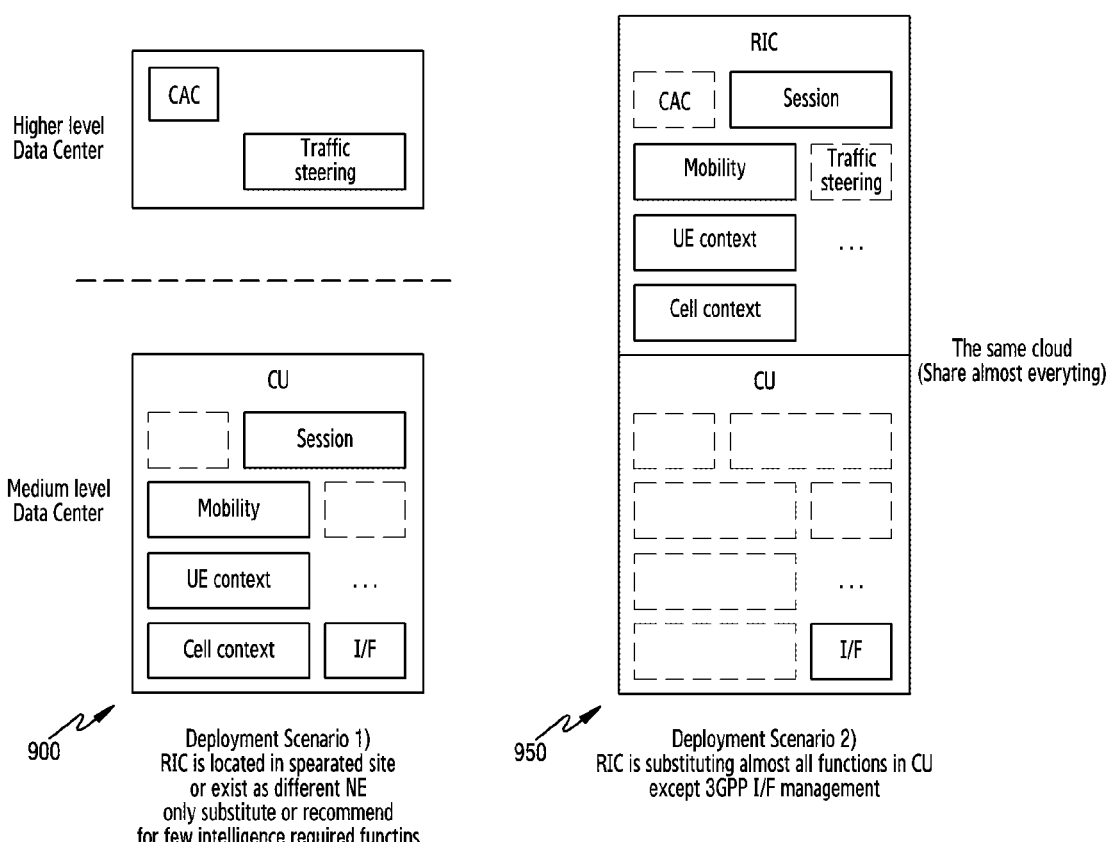

Higher level
Data Center

CAC

Traffic
steering

Medium level
Data Center

CU

Session

Mobility

UE context     . . .

Cell context     I/F

900

Deployment Scenario 1)
RIC is located in spearated site
or exist as different NE
only substitute or recommend
for few intelligence required functins

RIC

CAC          Session

Mobility      Traffic
              steering

UE context     . . .

Cell context

The same cloud
(Share almost everyting)

CU

. . .

I/F

950

Deployment Scenario 2)
RIC is substituting almost all functions in CU
except 3GPP I/F management

APPARATUS AND METHOD FOR MANAGING USER EQUIPMENT IN WIRELESS COMMUNICATION SYSTEM

CROSS-REFERENCE TO RELATED APPLICATIONS

This application is a continuation of International Application No. PCT/KR2022/009682, designating the United States, filed on Jul. 5, 2022 in the Korean Intellectual Property Receiving Office and claiming priority to Korean Patent Application No. 10-2021-0089392, filed on Jul. 7, 2021 the disclosures of which are incorporated by reference herein in their entireties.

BACKGROUND

Field

The present disclosure relates to an apparatus and/or a method for E2 node control for each user equipment (UE) by a near-real time (RT) radio access network (RAN) intelligent controller (RIC) in a non-RT RIC in an RAN. The present disclosure may relate to the apparatus and/or the method for controlling the near-RT RIC through an A1 message conforming to an open (O)-RAN standard of a wireless communication system.

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The 5G system, new radio or next radio (NR) is commercialized to satisfy demands for wireless data traffic, and provides a high data rate service to a user through the 5G system like 4G, and it is also expected that wireless communication services for various purposes such as internet of things and a service requiring high reliability for a specific purpose may be provided. Open radio access network (O-RAN) established by operators and equipment providers in a system where the current 4G communication system and the 5G system are used together defines a new network element (NE) and an interface standard based on the existing 3rd generation partnership project (3GPP) standard, and suggests an O-RAN structure.

SUMMARY

Based on the discussions described above, certain example embodiments herein provide an apparatus and/or method for generating as an A1 message and transferring to a near-real time (RT) radio access network (RAN) intelligent controller (RIC), a user equipment (UE) identifier (ID) used for an RIC to control an E2 node in a wireless communication system.

Also, an example embodiment provides an apparatus and/or method for transferring and configuring a UE ID used in an O-RAN and its related UE profile information to an O-RAN, a non-RT RIC, a near-RT RIC and an E2 node in a 5G core network.

According to an example embodiment, a method performed by a non-real time (RT) radio access network (RAN) intelligent controller (RIC) may include transferring a user equipment (UE) ID list (e.g., generic public subscription identifier (GPSI), access and mobility management function (AMF) UE NGAP ID, globally unique AMF ID (GUAMI)), a group ID (radio access technology/frequency selection priority (RFSP), and/or a subscriber profile ID (SPID) of a 5th (5G) core network to a non-RT RIC of an open RAN (O-RAN) service management & orchestration (SMO) at a network exposure function (NEF) of the 5G core network, transmitting an A1 policy request message including a UE ID to a near-RT RIC at the non-RT RIC of the O-RAN SMO, and subscribing and receiving an A1 policy update message including a UE ID from the near-RT RIC, and the 5G core NEF may store the UE ID of the non-RT RIC in a database (DB), and include information for storing and managing the received UE ID list of the 5G core network with the O-RAN UE ID received at the near-RT RIC and the E2 node. In addition, a message format of an A1 interface transferred from the non-RT RIC to the near-RT RIC may also be included.

According to an example embodiment, a method for requesting a UE ID from a core network by an SMO/non-RT RIC may include requesting/transferring the UE ID stored in the 5G core network from a network exposure function of a 5G core network to the SMO/non-RT RIC, receiving an O-RAN UE (e.g., including AMF UE NGAP ID, GUAMI) by the non-RT RIC to an E2 node via an O1 interface, transferring O-RAN UE IDs to a near-RT RIC using an A1 policy message at the non-RT RIC, subscribing to request to notify changes of the O-RAN UE ID to the near-RT RIC at the non-RT RIC, including an A1 message format and its associated process and information, and UE ID management information of the non-RT RIC may include messages of Nnef I/F, and A1 I/F.

A method performed by a non-RT RIC according to an example embodiment may include obtaining first information related to UE identity of an O-RAN from an E2 node, obtaining second information related to the UE identity from a NEF of a 5G core network (5GC), generating an A1 policy message through comparison based on the first information and the second information, and transmitting the A1 policy message to a near-RT RIC via an A1 interface, the first information may include a GPSI, an AMF UE NGAP ID related to the 5GC and a GUAMI related to the 5GC, and the second information may include an AMF UE NGAP ID related to the 5GC and a GUAMI related to the 5GC.

An apparatus for performing a non-RT RIC according to an example embodiment may include at least one transceiver and at least one processor (including processing circuitry), the at least one processor may be configured to obtain first information related to UE identity of an O-RAN from an E2 node, obtain second information related to the UE identity from a NEF of a 5GC, generate an A1 policy message by comparing the first information and the second information, and transmit the A1 policy message to a near-RT RIC via an A1 interface, the first information may include a GPSI, an AMF UE NGAP ID related to the 5GC and a GUAMI related to the 5GC, and the second information may include an AMF UE NGAP ID related to the 5GC and a GUAMI related to the 5GC.

An apparatus and/or a method according to an example embodiment may include a message and a related procedure for a non-real time (RT) radio access network (RAN) intelligent controller (RIC) to transfer open (O)-RAN user equipment (UE) identifiers (IEs) generated if a UE is connected to an evolved node B (eNB) using an A1 interface or an O1 interface, a procedure in which the non-RT RIC exchanges an external UE ID general public subscription identifier (GPSI) and an access and mobility management function (AMF) UE next generation application protocol (NGAP) ID, and a globally unique AMF ID (GUAMI) from a core network, by communicating with a network exposure function of a 5G core network, and a procedure for storing and managing the received UE ID related parameters in a data base.

Example effects obtainable from an example embodiment are not limited to the above-mentioned effects, and other effects which are not mentioned may be clearly understood by those skilled in the art of an example embodiment through the following descriptions.

BRIEF DESCRIPTION OF THE DRAWINGS

The above and other aspects, features and advantages of certain an example embodiment will be more apparent from the following detailed description, taken in conjunction with the accompanying drawings, in which:

FIG. 9 illustrates function split examples between a centralized unit (CU) and a RIC according to an example embodiment.

DETAILED DESCRIPTION

Figure 1:
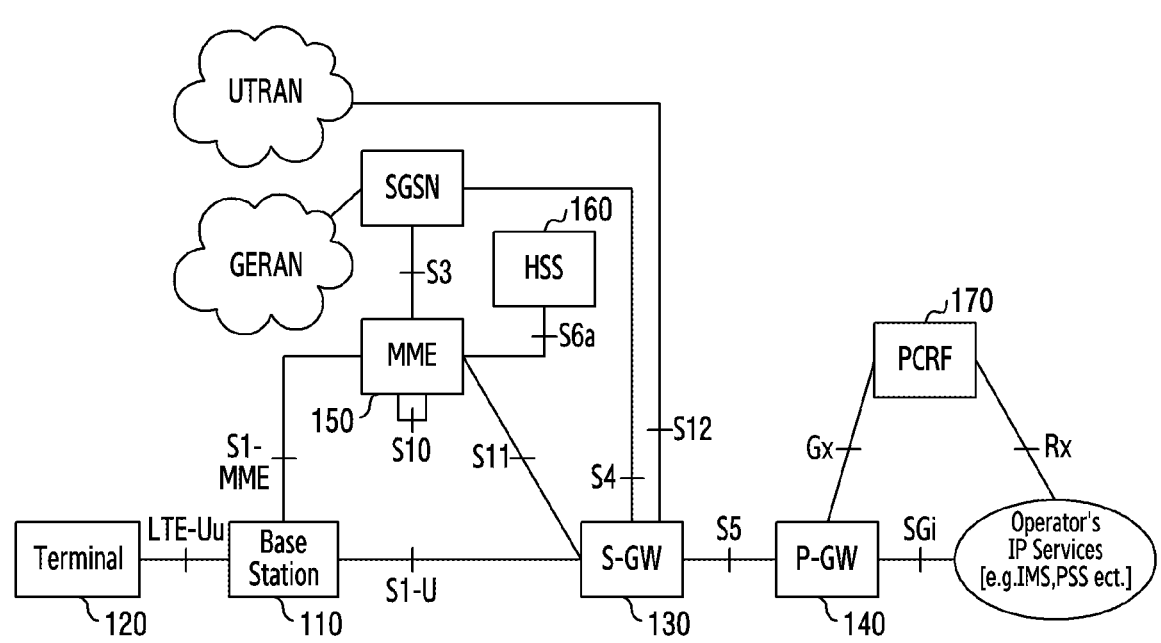
FIG. 1 illustrates an example of a 4th generation (4G) long term evolution (LTE) core system.

Terms used in the present disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, may not be interpreted as ideal or excessively formal meanings.

In some cases, even terms defined in the present disclosure may not be interpreted to exclude embodiments of the present disclosure.

A hardware-based approach will be described as an example in various embodiments of the present disclosure to be described hereafter. However, various embodiments of the present disclosure include technology which uses both hardware and software, and accordingly various embodiments of the present disclosure do not exclude a software-based approach.

Hereafter, the preset disclosure relates to a control procedure between a device in a radio access network (RAN) and a device which controls the RAN in a wireless communication system. Specifically, an example embodiment relates to a procedure, a message, and a method for a RAN intelligent controller (RIC) to transmit a RIC control request message to an E2 node on an E2 interface, and identifying whether the E2 node correctly performs or fails in RIC control request, and its reason if it fails in the RAN. Each embodiment herein may be used in combination with any other embodiment(s) herein.

Terms for signals, terms indicating channels, terms indicating control information, terms indicating network entities, and terms indicating components of a device used in the following explanation are illustrated for convenience of description. Accordingly, the present disclosure is not limited to the terms to be described, and other terms having the same technical meaning may be used.

Also, in an example embodiment, to determine whether a specific condition is satisfied or fulfilled, expressions such as greater than or less than are used but are merely an expression by way of example, and do not exclude expressions of equal to or greater than or equal to or less than. A condition expressed as 'greater than or equal to' may be replaced by 'greater than', a condition expressed as 'less than or equal to' may be replaced by 'less than', and a condition expressed as 'greater than or equal to and less than' may be replaced by 'greater than and less than or equal to'.

In addition, an example embodiment describes various embodiments using terms used in some communication standard (e.g., 3rd generation partnership project (3GPP), open (O)-RAN), but this is only an example for description. Various embodiments of the present disclosure may be easily modified and applied, in other communication systems.

As $4^{th}$ generation (4G)/$5^{th}$ generation communication systems (e.g., new radio (NR)) are commercialized, differentiated service support is demanded for users in a virtualized network. The 3GPP is a joint research project among mobile communication related organizations, and aims to complete a 3G mobile communication system standard—applicable worldwide—within the scope of international mobile telecommunications (IMT)-2000 project of international telecommunication union (ITU). The 3GPP was established in December 1998, and the 3GPP standard is based on the advanced global system for mobile communications (GSM) standard, and includes radio and core networks, and service architecture all within the standardization scope. Accordingly, O-RAN has newly defined a radio unit (RU), a digital unit (DU), a central unit (CU)-control plane (CP) and a CU-user plane (UP) which are nodes constituting a 3GPP network entity (NE) and a base station as an O-RAN (O)-RU, an O-DU, an O-CU-CP, and an O-CU-UP respectively, and additionally standardized a near-real-time (NRT) RIC. Each "unit" herein may comprise circuitry. An example embodiment is to support an operator specific service model in the E2 interface where the RIC requests a service from the O-DU, the O-CU-CP, or the O-CU-UP. Herein, the O-RU, the O-DU, the O-CU-CP, and the O-CU-UP may be understood as objects constituting the RAN which may operate according to the O-RAN standard, and may be referred to as E2 nodes. An interface with objects constituting the RAN which may operate according to the O-RAN standard between the RIC and the E2 nodes uses an E2 application protocol (AP).

The RIC is a logical node for collecting information on a cell site transmitted and received between a user equipment (UE) and the O-DU, the O-CU-CP, or the O-CU-UP. The RIC may be implemented as a server centrally deployed in one physical location. The O-DU and the RIC, the O-CU-CP and the RIC, and the O-CU-UP and the RIC may be connected through Ethernet. For doing so, an interface standard for communications between the O-DU and the RIC, between the O-CU-CP and the RIC, and between the O-CU-UP and the RIC is required, and it is demanded to define a message standard such as E2-DU, E2-CU-CP, E2-CU-UP and a procedure between the O-DU, the O-CU-CP, the O-CU-UP and the RIC. In particular, differentiated service support is required for users in a virtualized network, and it is necessary to define message functions of E2-DU, E2-CU-CP and E2-CU-UP to support a service for wide cell coverage, by concentrating a call processing message/function generating in the O-RAN on the RIC.

The RIC may communicate with the O-DU, the O-CU-CP, and the O-CU-UP using the E2 interface, and may configure an event occurrence condition by generating and transmitting a subscription message. Specifically, the RIC may configure a call processing EVENT by generating an E2 subscription request message and transferring it to the E2 node (e.g., the O-CU-CP, the O-CU-UP, the O-DU). In addition, after configuring the EVENT, the E2 node forwards a subscription request response message transferred to the RIC.

The E2 node may transmit a current state to the RIC through an E2 indication/report. The RIC may provide control for the O-DU, the O-CU-CP, and the O-CU-UP using an E2 control message. Various embodiments of suggest an E2 indication message for transmitting UE based measurement information, by period configured in the subscription event condition at the O-DU. In addition, various embodiments suggest a message for controlling a resource transmitted from the RIC to the O-DU.

FIG. 1 illustrates an example of a 4G long term evolution (LTE) core system.

Referring to FIG. 1, the LTE core system includes a base station 110, a terminal 120, a serving gateway (S-GW) 130, a packet data network gateway (P-GW) 140, a mobility management entity (MME) 150, a home subscriber server (HSS) 160, and a policy and charging rule function (PCRF) 170.

The base station 110 is a network infrastructure for providing radio access to the terminal 120. For example, the base station 110 is a device which performs scheduling by collecting status information such as a buffer status, an available transmission power, and a channel status of the terminal 120. The base station 110 has coverage defined as a specific geographic region based on a signal transmission distance. The base station 110 is connected to the MME 150 through an S1-MME interface. Besides the base station, the base station 110 may be referred to as an 'access point (AP)', an 'eNodeB (eNB)', a 'wireless point', a 'transmission/reception point (TRP)' or other term having the equivalent technical meaning.

The terminal 120 is a device used by the user, and communicates with the base station 110 over a radio channel. In some cases, the terminal 120 may be operated without user's involvement. That is, at least one of the terminal 120 may be a device which performs machine type communication (MTC), and may not be carried by the user. Besides the terminal, the terminal 120 may be referred to as a 'UE', a 'mobile station', a 'subscriber station', a 'customer-premises equipment (CPE)', a 'remote terminal', a 'wireless terminal', or a 'user device' or other term having the equivalent technical meaning.

The S-GW 130 provides a data bearer, and generates or controls the data bearer under control of the MME 150. For example, the S-GW 130 processes a packet arriving from the base station 110 or a packet to be forwarded to the base station 110. In addition, the S-GW 130 may perform an anchoring role in handover of the terminal 120 between base stations. The P-GW 140 may function as a connection point to an external network (e.g., an internet network). In addition, the P-GW 140 allocates an internet protocol (IP) address to the terminal 120, and serves as an anchor for the S-GW 130. In addition, the P-GW 140 may apply quality of service (QoS) policy of the terminal 120, and manage accounting data.

The MME 150 manages mobility of the terminal 120. In addition, the MME 150 may perform authentication, bearer management, and the like on the terminal 120. That is, the MME 150 is responsible for mobility management and various control functions of the terminal. The MME 150 may interwork with a serving general packet radio service (GPRS) support node (SGSN).

The HSS 160 stores key information and a subscriber profile for the authentication of the terminal 120. The key information and the subscriber profile are transmitted from the HSS 160 to the MME 150 if the terminal 120 accesses the network.

The PCRF 170 defines a policy and a charging rule. The stored information is transmitted from the PCRF 170 to the P-GW 140, and the P-GW 140 may control the terminal 120 (e.g., QoS management, charging, etc.) based on at least the information provided from the PCRF 170.

Carrier aggregation (hereafter, 'CA') technology is a technology which combines a plurality of component carriers, and transmits and receives at one terminal a signal using the plurality of the component carriers at the same time and thus increases frequency use efficiency in terms of the terminal or the base station. Specifically, according to the CA technology, the terminal and the base station may transmit and receive signals using a broadband using the plurality of the component carriers in the uplink (UL) and the downlink (DL), wherein the component carriers are located in different frequency bands respectively. Hereafter, the UL indicates a communication link through which the terminal transmits a signal to the base station, and the DL indicates a communication link through which the base station transmits a signal to the terminal. At this time, the numbers of uplink component carriers and downlink component carriers may be different.

Dual connectivity or multi connectivity is a technology for increasing the frequency use efficiency in terms of the terminal or the base station, in which one terminal is connected to a plurality of different base stations and transmits and receives signals simultaneously using carriers within the plurality of the base stations positioned in different frequency bands. The terminal may be connected to a first base station (e.g., a base station which provides services using the LTE technology or the 4G mobile communication technology) and a second base station (e.g., a base station which provides services using the NR technology or 5G mobile communication technology) at the same time to transmit and receive traffic. In this case, frequency resources used by each base station may be positioned in different bands. As such, the operation scheme based on the dual connectivity scheme of the LTE and the NR may be referred to as 5G non-standalone (NSA).

Figure 2A:
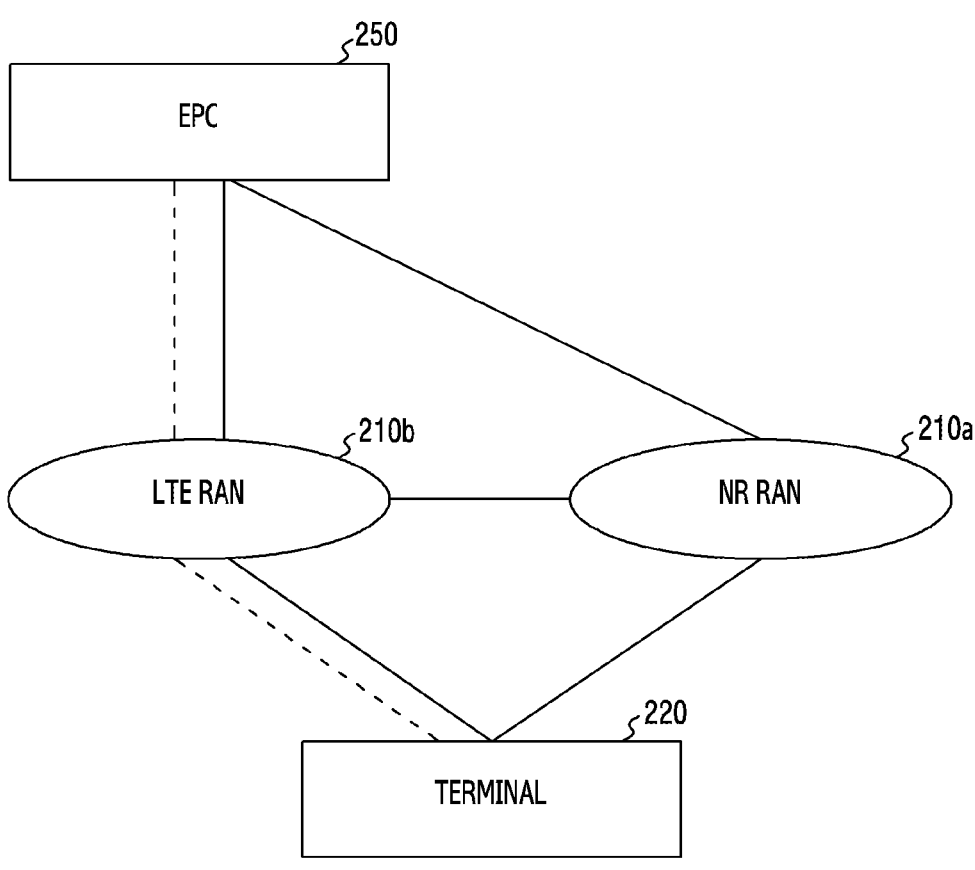
FIG. 2A illustrates an example of a 5th generation (5G) non-standard alone (NSA) system.

FIG. 2A illustrates an example of a 5G NSA system.

Referring to FIG. 2A, the 5G NSA system includes an NR RAN 210a, an LTE RAN 210b, a terminal 220, and an evolved packet core network (EPC) 250. The NR RAN 210a and the LTE RAN 210b are connected to the EPC 250, and the terminal 220 may be served by any one or both of the NR RAN 210a and the LTE RAN 210b at the same time. The NR RAN 210a includes at least one NR base station, and the LTE RAN 210b includes at least one LTE base station. Herein, the NR base station may be referred to as a '5G node', a 'next generation nodeB (gNB)' or other term having the equivalent technical meaning. In addition, the NR base station may have a structure divided into a CU and a DU, and the CU may also have a structure divided into a CU-CP unit and a CU-UP unit.

In the structure shown in FIG. 2A, the terminal 220 may perform radio resource control (RRC) access through the first base station (e.g., a base station belonging to the LTE RAN 210b), and may be serviced with functions (e.g., connection management, mobility management, etc.) provided in the control plane. In addition, the terminal 220 may receive additional radio resources for transmitting and receiving data via a second base station (e.g., a base station belonging to the NR RAN 210a). This dual connectivity technology using the LTE and the NR may be referred to as evolved universal terrestrial radio access (E-UTRA)-NR (EN)-dual connectivity (DC). Similarly, the dual connectivity technology in which the first base station uses the NR technology and the second base station uses the LTE technology is referred to as NR-E-UTRA (NE)-DC. In addition, various embodiments may be applied to the multi connectivity and the CA technology of various types. In addition, various embodiments may be applicable even if a first system using a first communication technology and a second system using a second communication technology are implemented in one device or if the first base station and the second base station are located at the same geographic location.

Figure 2B:
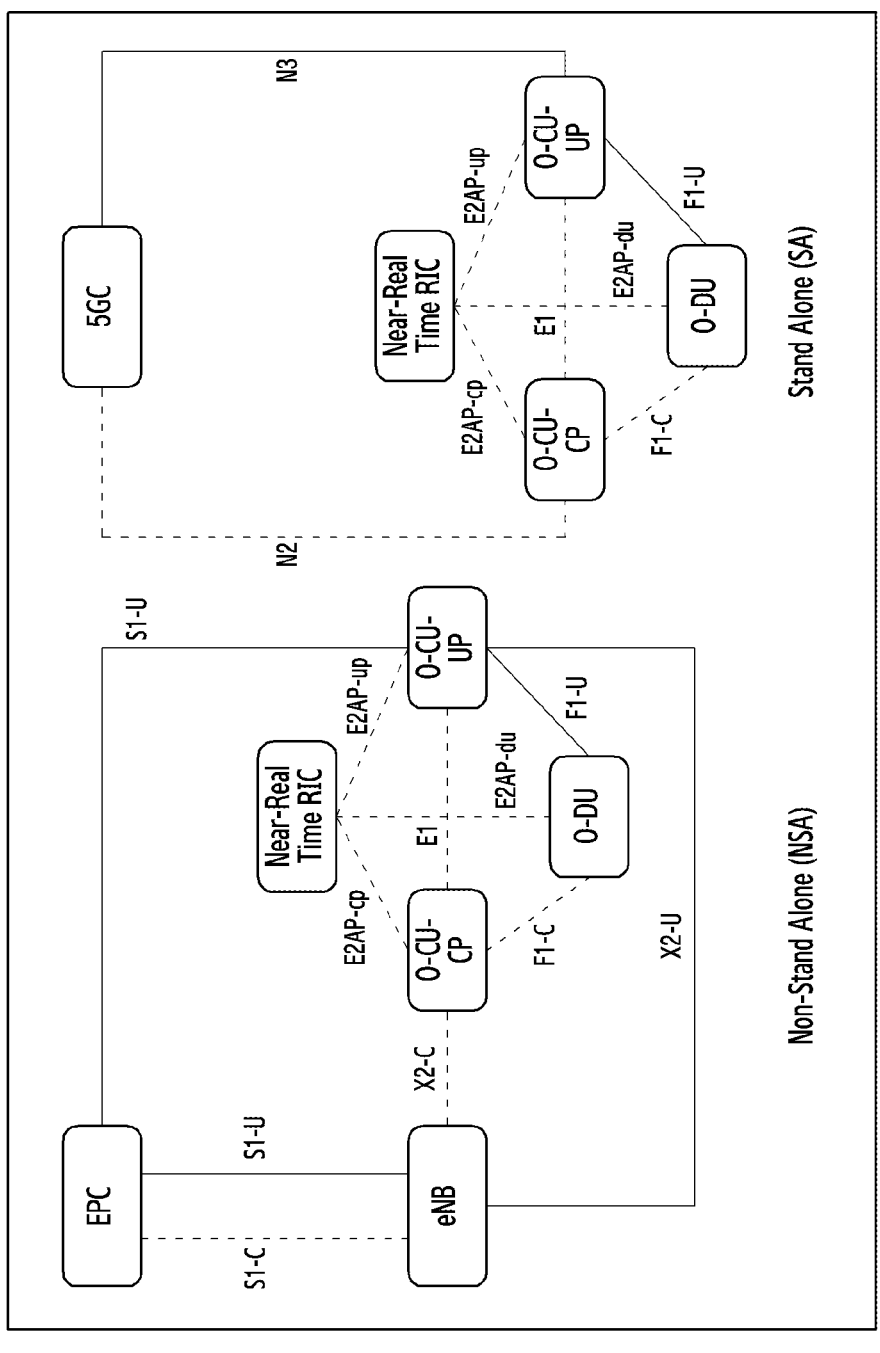
FIG. 2B illustrates an example of architecture for open-radio access network (O-RAN).

FIG. 2B illustrates an architecture example for the O-RAN. For the sake of E2-SM-KPI monitoring (KPIMON) of an E2 service model, an O-RAN non-stand alone in the multi-connectivity operation using the E-UTRA and the NR radio access technology is considered, whereas the E2 node may be assumed to be in an O-RAN stand alone mode.

Referring to FIG. 2B, in deployment of the O-RAN non-stand alone mode, the eNB is connected with the EPC through an S1-C/S1-U interface, and is connected with the O-CU-CP through an X2 interface. The O-CU-CP for the deployment of the O-RAN stand alone mode may be connected with a 5G core (5GC) through an N2/N3 interface.

Figure 3:
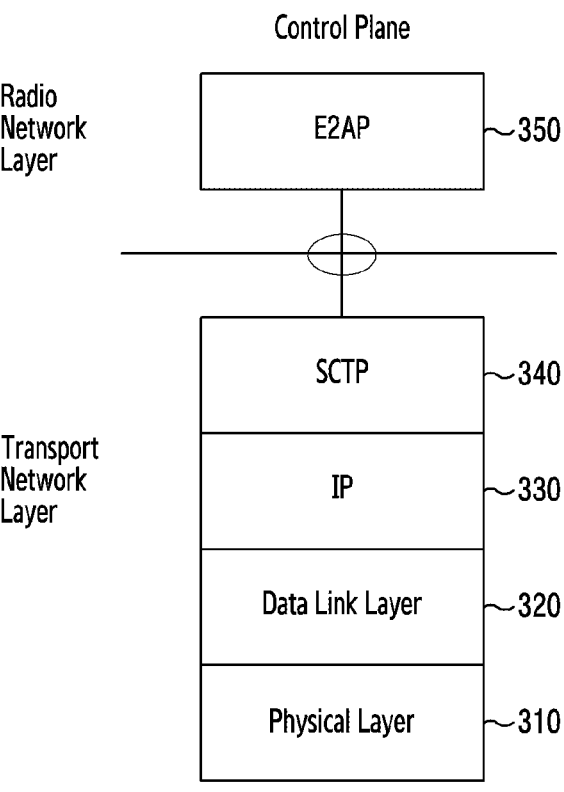
FIG. 3 illustrates a protocol stack of an E2 application protocol message in a radio access network according to an example embodiment.

FIG. 3 illustrates a protocol stack of an E2 application protocol message in a radio access network according to an example embodiment. Referring to FIG. 3, a control plane includes a transport network layer and a radio network layer. The transport network layer includes a physical layer 310, a data link layer 320, an IP 330, and a stream control transmission protocol (SCTP) 340.

The radio network layer includes an E2AP 350. The E2AP 350 is used to deliver a subscription message, an indication message, a control message, a service update message, and a service query message, and is transmitted in a higher layer of the SCTP 340 and the IP 330.

Figure 4:
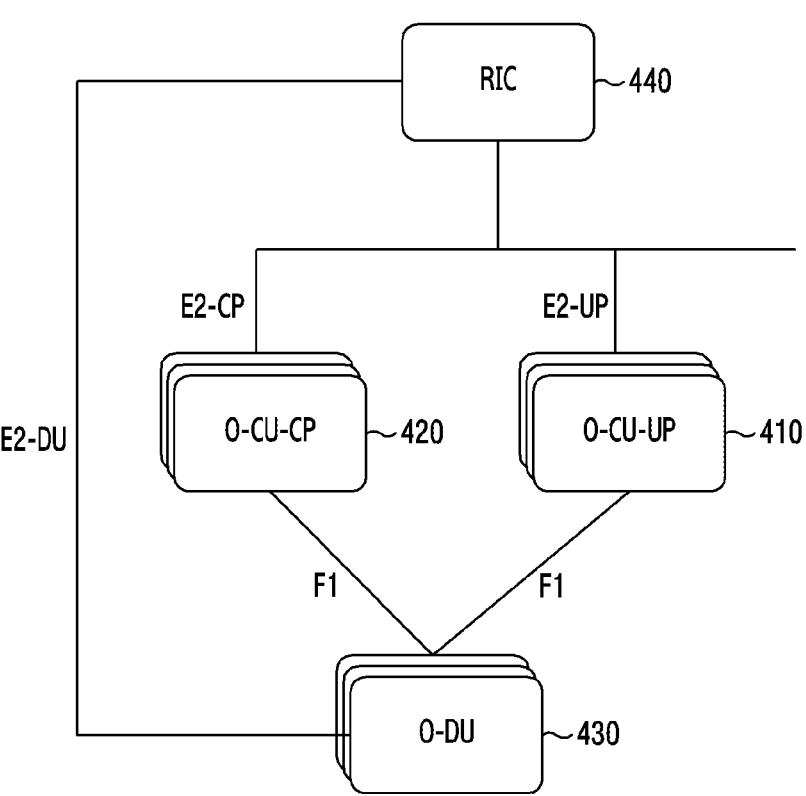
FIG. 4 illustrates an example of connection between a base station and a radio access network (RAN) intelligence controller (RIC) in a radio access network according to an example embodiment.

FIG. 4 illustrates an example of connection between a base station and an RIC in a radio access network according to an example embodiment.

Referring to FIG. 4, an RIC 440 is connected to an O-CU-CP 420, an O-CU-UP 410, and an O-DU 430. The RIC 440 is a device for customizing RAN functionality for a new service or regional resource optimization. The RIC 440 may provide functions such as network intelligence (e.g., policy enforcement, handover optimization), resource assurance (e.g., radio-link management, advanced self-organized-network (SON)), resource control (e.g., load balancing, slicing policy). The RIC 440 may communicate with the O-CU-CP 420, the O-CU-UP 410, and the O-DU 430. The RIC 440 may be connected to each node through E2-CP, E2-UP, and E2-DU interfaces. In addition, the interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be used interchangeably.

While FIG. 4 illustrates one RIC 440, a plurality of RICs may exist, according to various embodiments. The plurality of the RICs may be implemented with a plurality of hardware located at the same physical location or may be implemented through virtualization using single hardware.

Figure 5:
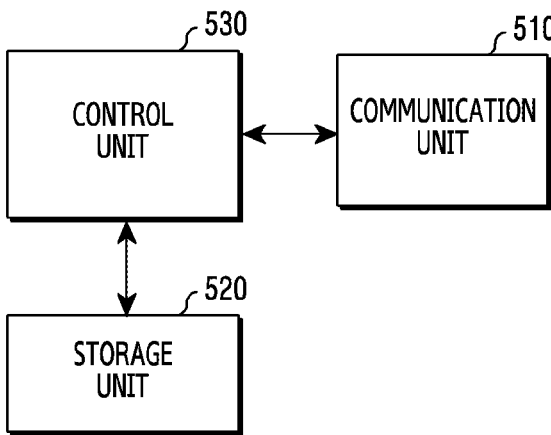
FIG. 5 illustrates a configuration of a device in a radio access network according to an example embodiment.

FIG. 5 illustrates a configuration of a device according to an example embodiment. The structure illustrated in FIG. 5 may be understood as a configuration of a device having at least one function of the nera-RT RIC, the non-RT RIC, the O-CU-CP, the O-CU-UP, and the O-DU of FIG. 5. A term such as ' . . . unit' or ' . . . er' used hereafter indicates a unit for processing at least one function or operation, and may be implemented using hardware, software, or a combination of hardware and software.

Referring to FIG. 5, a core network device includes a communication unit 510 including communication circuitry, a storage unit 520, and a control unit 530 including control circuitry.

The communication unit 510 provides an interface for performing communication with other devices in the network. That is, the communication unit 510 converts a bit string transmitted from the core network device to other device into a physical signal, and converts a physical signal received from other device into a bit string. That is, the communication unit 510 may transmit and receive signals. Accordingly, the communication unit 510 may be referred to as a modem, a transmitter, a receiver, or a transceiver. In this case, the communication unit 510 enables the core network device to communicate with other devices or systems via a backhaul connection (e.g., wired backhaul or wireless backhaul) or over the network.

The storage unit 520 stores data such as a basic program, an application program, and configuring information for the operations of the core network device. The storage unit 520 may include a volatile memory, a nonvolatile memory, or a combination of a volatile memory and a nonvolatile memory. The storage unit 520 provides the stored data according to a request of the control unit 530.

The control unit 530 controls general operations of the core network device. For example, the control unit 530 transmits and receives signals through the communication unit 510. In addition, the control unit 530 records and reads data in and from the storage unit 520. For doing so, the control unit 530 may include at least one processor (including processing circuitry). According to various embodiments, the control unit 530 may control the device to carry out operations according to various embodiments.

Figure 6:
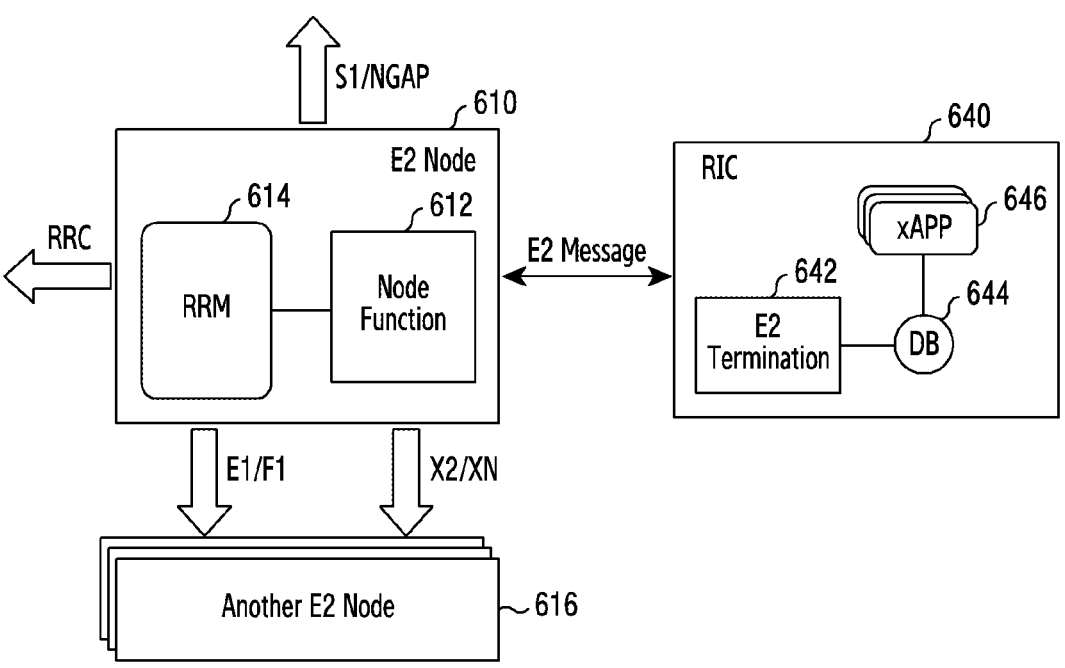
FIG. 6 illustrates logical functions related to E2 messages of an E2 node and a RIC in a radio access network according to an example embodiment.

FIG. 6 illustrates logical functions related to E2 messages of an E2 node and an RIC in a radio access network according to an example embodiment.

Referring to FIG. 6, an RIC 640 and an E2 node 610 may transmit or receive an E2 message between them. For example, the E2 node 610 may be an O-CU-CP, an O-CU-UP, an O-DU, or a base station. A communication interface of the E2 node may be determined according to the type of the E2 node 610. For example, the E2 node 610 may communicate with another possible E2 node 616 through the E1 interface or the F1 interface. Alternatively, for example, the E2 node 610 may communicate with the E2 node 616 through an X2 interface or an XN interface. Alternatively, for example, the E2 node 610 may perform communication through an S1 interface or a next generation application protocol (NGAP) interface (e.g., an interface between a next generation (NG) RAN node and an AMF).

The E2 node 610 may include an E2 node function 612. The E2 node function 612 is a function corresponding to a specific xApp (application S/W) 646 installed in the RIC 640. For example, in the KPI monitor, KPI monitor collection S/W may be installed in the RIC 640, and the E2 node 610 may include the E2 node function 612 which generates KPI parameters, and then forwards an E2 message including the KPI parameters to an E2 termination 642 positioned at the RIC 640. The E2 node 610 may include a radio resource management (RRM) 614. The E2 node 610 may manage resources provided to the radio network for the terminal.

The E2 termination 642 positioned in the RIC 640, which is a termination of the RIC 640 for the E2 message, may perform a function of interpreting the E2 message forwarded by the E2 node 610 and then forwarding it to the xApp 646. A database (DB) 644 positioned in the RIC 640 may be used for the E2 termination 642 or the xApp 646. The E2 node 610 shown in FIG. 6 is a termination of at least one interface, and may be understood as a termination of messages transmitted to a terminal, a neighbor base station, and a core network.

Figure 7:
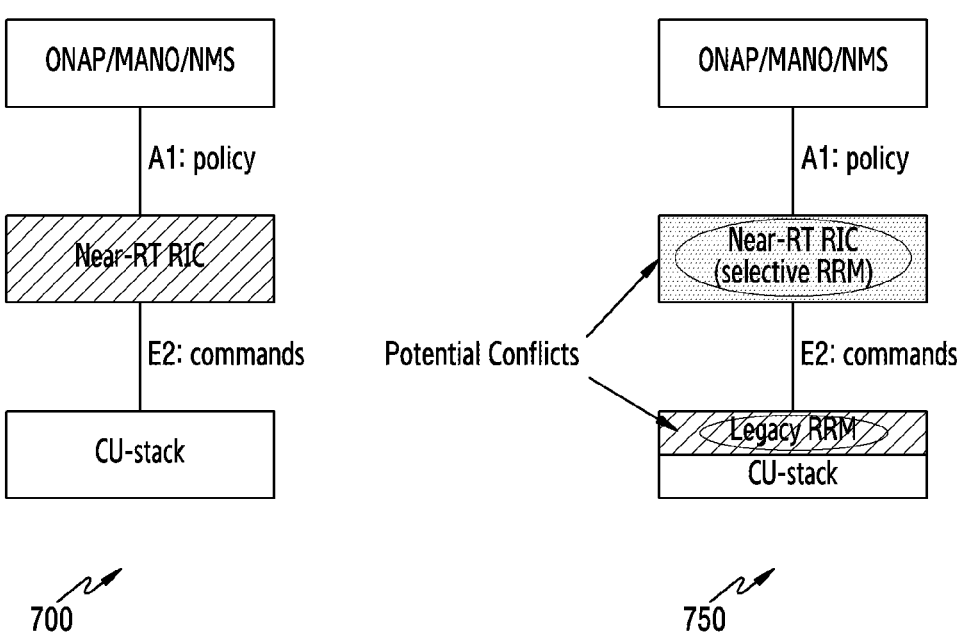
FIG. 7 illustrates function split examples between an E2 node and a RIC according to an example embodiment.

FIG. 7 illustrates function split examples between an E2 node and a RIC according to an example embodiment. The O-RAN standard provides the function split between the E2 node and the RIC. For example, the E2 node may be the CU. The RIC may be the near RT RIC. The RIC may be connected to an open network automation platform (ONAP)/management and orchestration (MANO)/network management system (NMS) through the A1 interface. The RIC may be connected to the E2 node through the E2 interface. The E2 interface may transfer commands. The function split option may include function split 700 which manages the whole RRM at the near-RT RIC, and/or function split 750 which selectively manages the RRM at the near-RT RIC.

The near-RT RIC is to support the E2 as an open logical interface for the sake of a multi-vendor environment regardless of specific RRC-RRM algorithm implementation located at the nRT-RIC according to WG3 decision of Jan. 16, 2019 meeting. An example embodiment may suggest an E2 service model radio interface control (E2SM-RIC) which pairs with E2SM-NI for injecting/modifying/configuring a per UE RRC message for each I/F and network entity (NE). In other words, the near RT RIC may be gradually improved from the function split 750 toward the function split 700. The E2 may advance to the open logical interface which is independent of specific RRC-RRM algorithm implementation in the near RT-RIC and aims at the multi-vendor environment.

Figure 8:
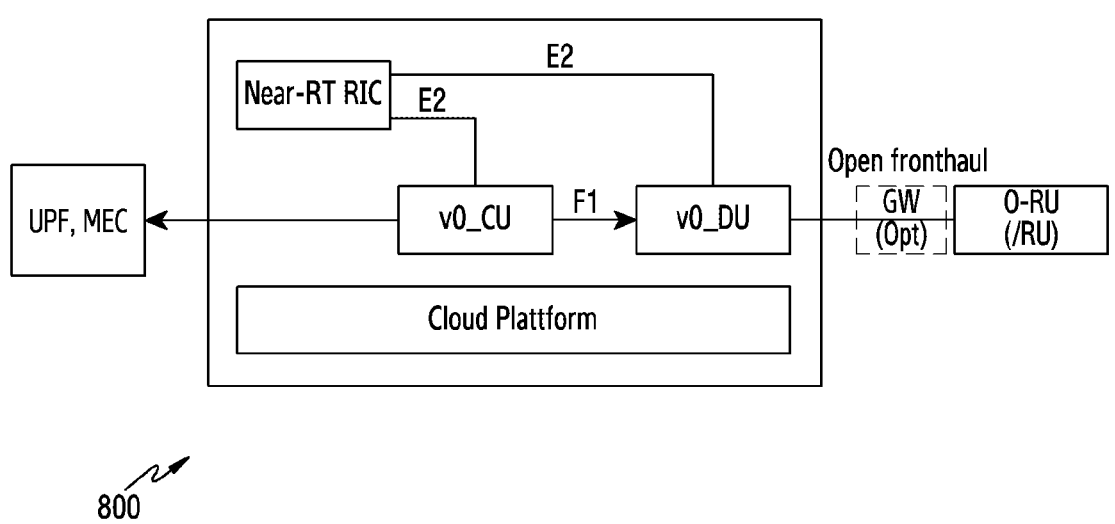
FIG. 8 illustrates an implementation example of an E2 node and a RIC according to an example embodiment.

FIG. 8 illustrates an implementation example of an E2 node and a RIC according to an example embodiment. In a scenario of an implementation example 800, the E2 node (e.g., an O-DU, an O-CU) and the RIC may be virtualized on a cloud platform (e.g., an open chassis and a blade spec edge cloud), and configured in a device (e.g., a server). This scenario may support distribution in an urban area crowded with abundant fronthaul capacity allowing a base band unit (BBU) function polled at a central location, with low latency enough to satisfy O-DU standby requirements. Hence, it may be unnecessary to attempt to centralize the RIC close to the RT over limits for centralizing the O-DU function. According to an embodiment, the E2SM-RIC may be optimized for the O-RAN distribution scenario which implements the near-RT RIC, the O-CU and the O-DU on the O-cloud platform.

FIG. 9 illustrates function split examples between a CU and a RIC according to an example embodiment. Referring to FIG. 9, the function splits may be performed according to a deployment scenario #1 900 or a function deployment scenario #2 950.

Deployment scenario #1 900: the RIC may be located in a separate site or exist as a different NE, and substitutes or recommends few required intelligence functions.

Deployment scenario #2 950: the RIC may substitute almost every function of the UE except 3GPP I/F management.

While FIG. 9 illustrates two scenarios, other scenarios may be applied. For example, the mobility function may be carried out by the RIC, rather than the CU, in the deployment scenario #1 900. Also, for example, the UE context may be carried out by the RIC, rather than the CU, in the deployment scenario #1 900. Also, for example, the session configuration function may be carried out by the RIC, rather than the CU, in the deployment scenario #1 900.

Figure 10:
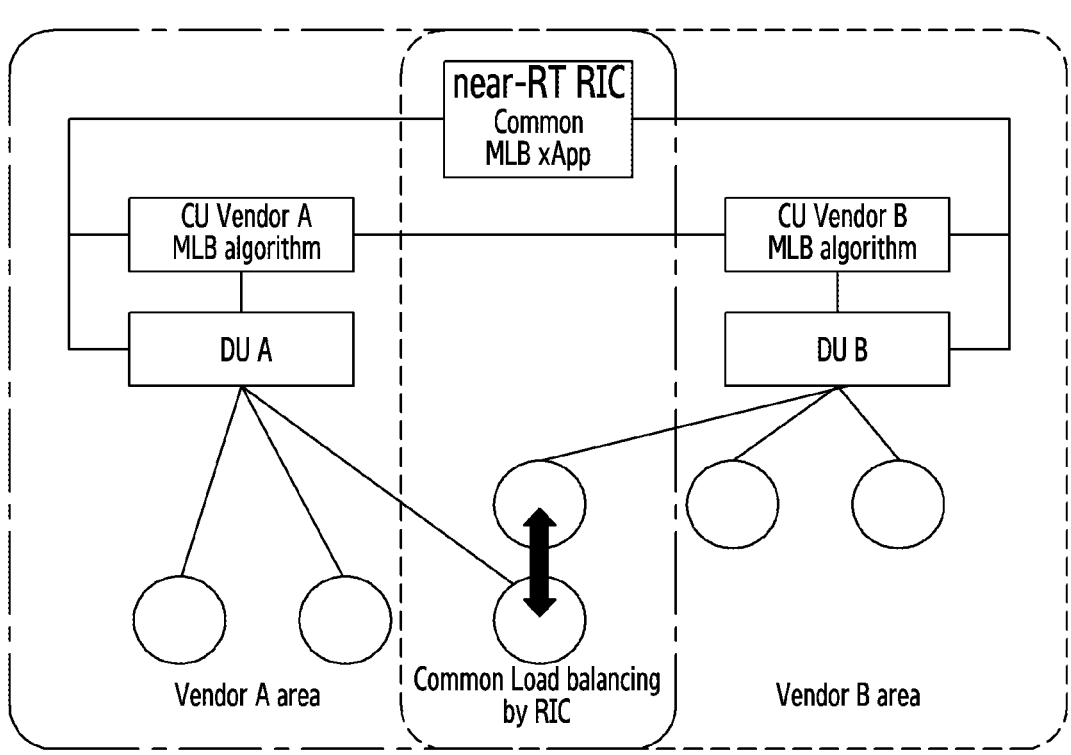
FIG. 10 illustrates an example of mobility load balancing (MLB) control for different vendors according to an example embodiment.

FIG. 10 illustrates an example of mobility load balancing (MLB) control for different vendors according to an example embodiment. Such MLB may be conducted under RRM control. A first CU and a first DU may be provided by a vendor A. A second CU and a second DU may be provided by a vendor B. The first DU may provide a service area of the vendor A. RUs connected with the first DU may provide the service area of the vendor A. The second DU may provide a service area of the vendor B. RUs connected with the second DU may provide the service area of the vendor B.

If a UE moves, which cell is optimal may be performed through load balancing. If this load balancing is conducted by different vendors, it may be difficult to smoothly perform the load balancing in a space where the service areas of the vendors overlap. That is, an inter vendor zone or an inter CU-CP area may require interworking of the vendors. For the interworking of the vendors, the RRM control may require centralized execution. Hence, the RIC according to various embodiments may be configured to perform the RRM. The RIC may not only receive measurement from each E2 node, but also generate a message for controlling each E2 node. The RIC may transmit a control message to each E2 node (e.g., the DU or the CU-CP, the CU-UP).

Figure 11:
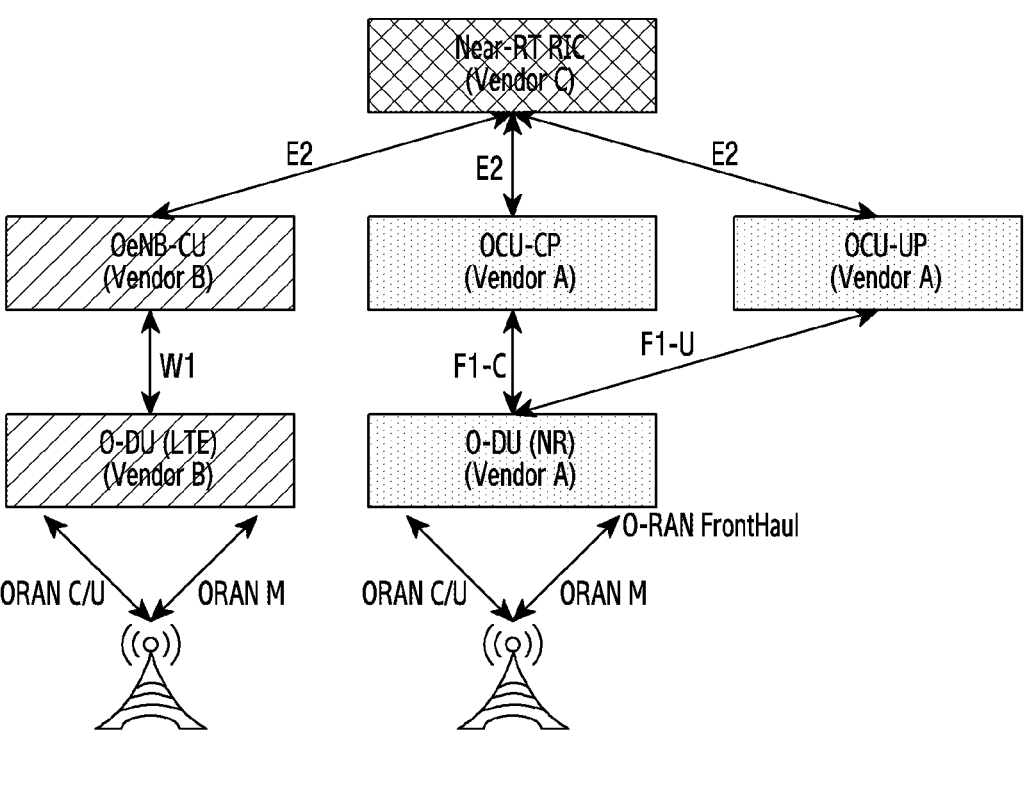
FIG. 11 illustrates an example of MLB control for different vendors according to an example embodiment.

FIG. 11 illustrates an example of MLB control for different vendors according to an example embodiment. First, unlike FIG. 11, if a single vendor operates, RAN context may be identified at the near-RT RIC. In addition, trigger event/report, insert, policy conditions may operate. A control action may also operate, and a general subfunction definition approach may also operate. However, as shown in FIG. 11A, if multiple vendors operate, the RAN context need not be identified at the near-RT RIC. In addition, the trigger event/report, insert, policy conditions do not operate. The control action may not operate or may rely on the implementation, due to local RRM conflict.

The single E2SM-RAN control hardly operates in the O-RAN situation of the multi-vendor environment. This is because there are function parity and operation parity, considering all RAN features. The RAN function parity indicates a difference of features related to the RRM functions (e.g., QoS handover, load balancing (LB) handover, etc.). The RAN operation parity indicates a difference of features related to the RAN operations (e.g., an EN-DC SCG bearer change procedure). Besides, the REPORT/INSERT/CONTROL/POLICY actions may not identify accurate RAN CONTEXT. In addition, the REPORT/INSERT/CONTROL/POLICY actions may not identify trigger event/conditions according to the REPORT/INSERT/POLICY. In addition, it may be difficult to refer to the RAN context in a specific deployment in a corresponding action.

Referring to FIG. 11, a wireless communication environment 1100 shows network entities configured through three vendors in total. The vendor A may be an NR provider. The vendor B may be an LTE provider. The vendor C may be a RIC provider. To address the above-stated problems, no matter which vender's E2 node is connected, one entity for managing all of them is required. Since the near-RT RIC may collect measurement information of different vendors, the near-RT RIC may more easily perform the management and the control than other entities. Hence, the near-RT RIC performs the RRM in the centralized manner, and thus difference and compatibility problems between the vendors may be addressed. Besides, the difference and compatibility problems between the vendors may be addressed, even with different RATs.

Hereafter, the centralized RRM by the near-RT RIC may be referred to and described as terms such as RIC-based RRM control or E2 node zombie mode, E2SM-RIC zombie mode, E2SM-RIC dedicated mode in an example embodiment. It is noted that the technical meaning that the function of each E2 node is performed by the RIC instead may be used in place of the illustrated terms.

Figure 12A:
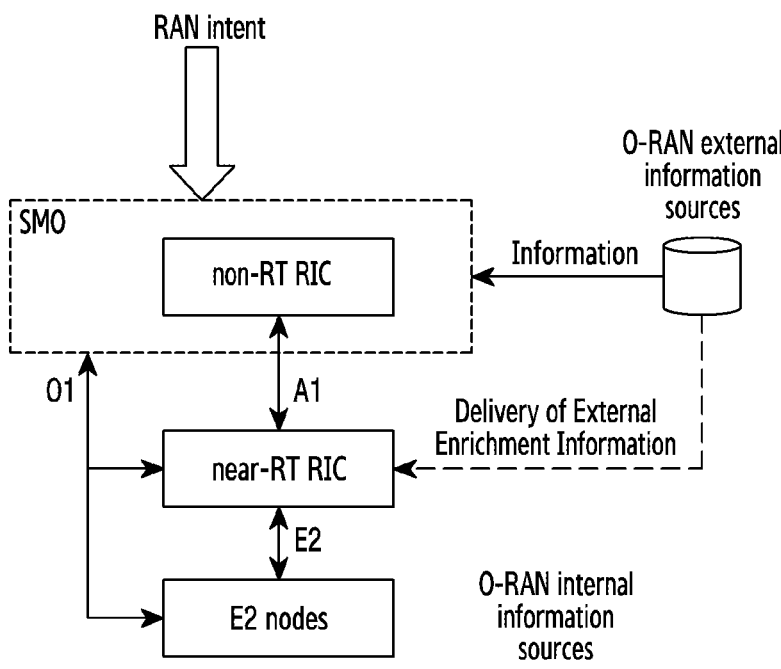
FIG. 12A illustrates an example of interfaces between a non-real time (RT) RIC, a near-RT RIC, and a service management & orchestration (SMO) according to an example embodiment.

FIG. 12A an example of interfaces between non-RT RIC, a near-RT RIC, and a service management & orchestration (SMO) according to an example embodiment. FIG. 12A illustrates the interfaces (e.g., A1 interface, E2 interface, O1 interface) between the SMO/non-RT RIC, the near-RT RIC and the E2 nodes in the O-RAN standard for storing an O-RAN UE ID and establishing connection with the UE ID defined in the 5G core network, and external information sources according to an example embodiment.

Referring to FIG. 12A, the non-RT RIC may transmit or receive a message to or from the near RT RIC over the A1 interface. The near RT RIC may transmit or receive a message to or from the E2 node over the A1 interface. The near RT RIC and the E2 node may transmit or receive a message to or from the SMO over the O1 interface. The SMO may include the non-RT RIC. The SMO may communicate with all of external sources and internal sources, for efficient RAN management. According to an embodiment, the O-RAN external information source may provide information to the SMO. According to an embodiment, the O-RAN external information source may provide information to the near-RT RIC. A detailed functional configuration of the SMO shall be described in FIG. 12C.

Figure 12B:
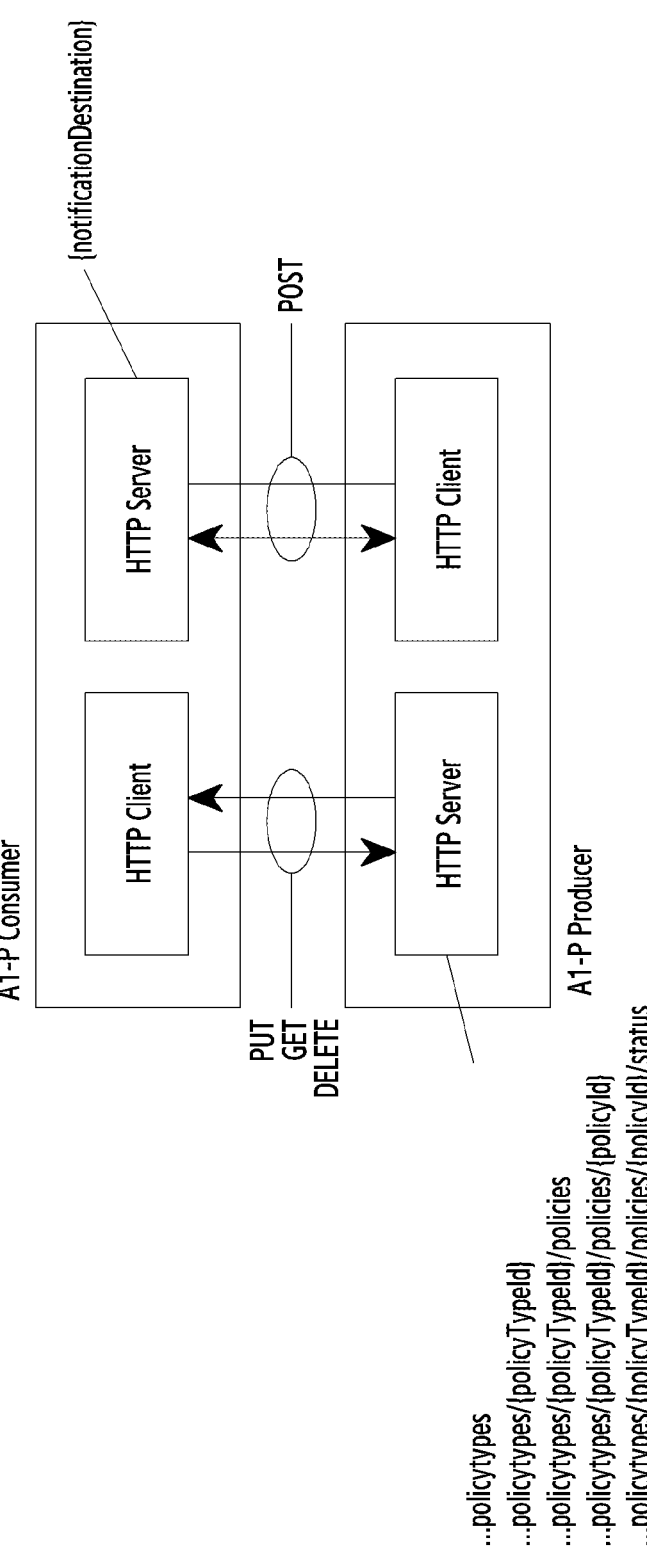
FIG. 12B illustrates an example of an A1 interface according to an example embodiment.

FIG. 12B illustrates an example of the A1 interface according to an example embodiment. FIG. 12B illustrates the A1 interface of the non-RT RIC and the near-RT RIC according to an example embodiment. According to an embodiment, the A1 interface is defined as a RESTFUL message, and the non-RT RIC and the near-RT RIC may operate as a consumer and a producer respectively and transmit and receive messages in both directions. For example, the non-RT RIC may be an A1-P consumer, and the near RT RIC may be an A1-P producer. As another example, the non-RT RIC may be an A1-P producer, and the near RT RIC may be an A1-P consumer. The A1-P consumer may include at least one of a hypertext transfer protocol (HTTP) client and an HTTP server. Likewise, the A1-P producer may at least one of the HTTP client and the HTTP server. The HTTP client may transmit or receive an A1 policy message to or from the HTTP server.

Figure 12C:
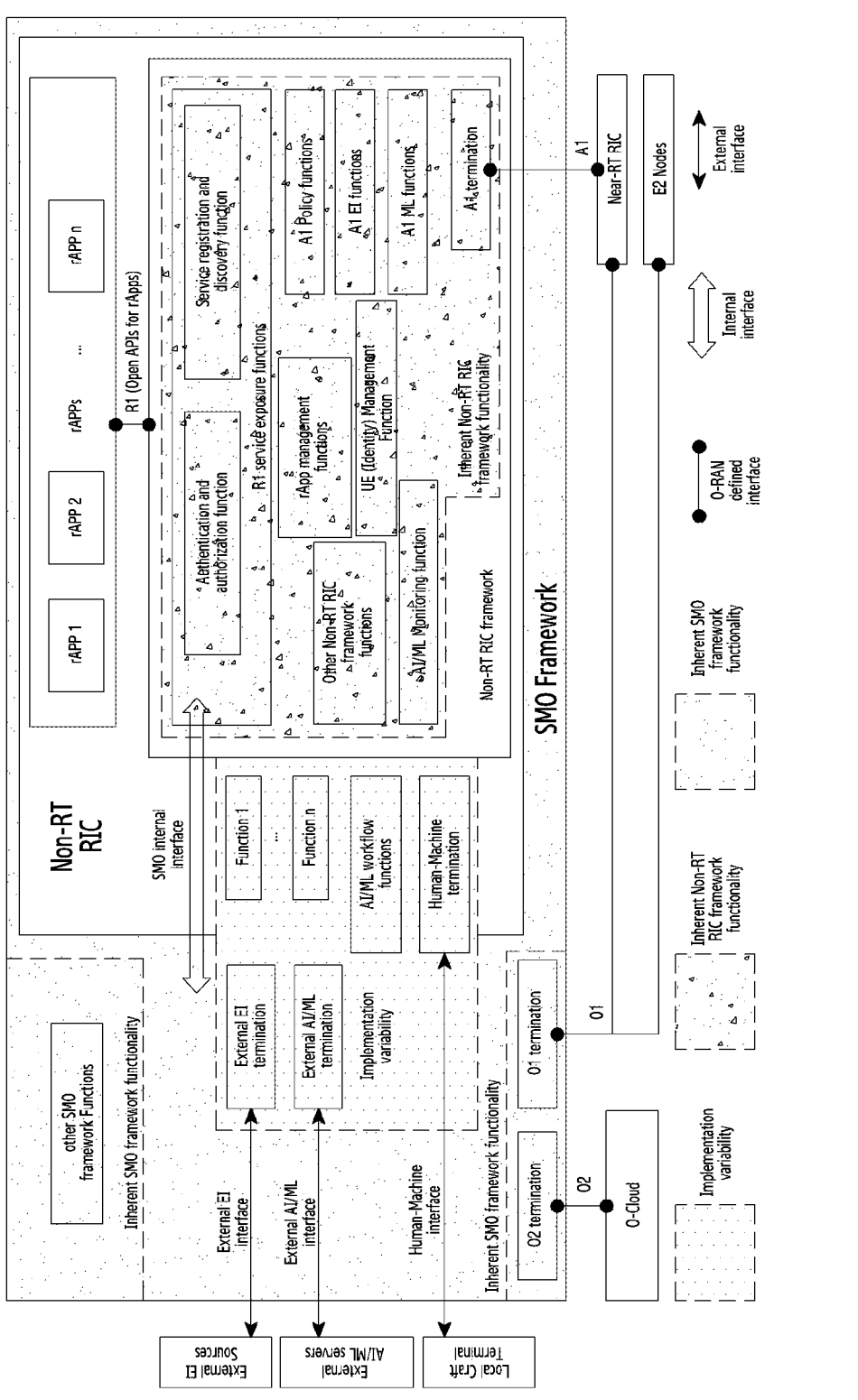
FIG. 12C illustrates an example of a SMO framework according to an example embodiment.

FIG. 12C illustrates an example of an SMO framework according to an example embodiment. FIG. 12C illustrates a UE identity management function in an internal structure of the non-RT RIC defined in the standard according to an example embodiment.

Referring to FIG. 12C, the non-RT RIC may include the UE identity management function (IMF). An example embodiment refers to and describes the UE IMF, but may use other term referring to the corresponding functional configuration instead. For example, it may be understood that the non-RT RIC performs functions/operations of the UE IMF such as a UE ID manager, a UE ID controller, a UE manager, a UE controller, a UE ID controller, a UE identifier to be described. Each "controller" herein may comprise circuitry.

According to an example embodiment, the non-RT RIC may store UE ID information defined in the O-RAN. The UE IMF of the non-RT RIC may store the UE ID information defined in the O-RAN in a data base. According to an embodiment, the non-RT RIC may receive an O-RAN UE ID list (e.g., including an AMF UE NGAP ID, a globally unique AMF ID (GUAMI), a radio frequency selection priority (RFSP)) from the A1 interface or the O1 interface and information such as general public subscription identifier (GPSI), AMF UE NGAP ID, GUAMI, RFSP provided from the 5G core network from the external E1 interface. The non-RT RIC stores the information received from the 5G core network in the database, in the UE IMF.

According to an example embodiment, the non-RT RIC may communicate with the SMO over the SMO internal interface.

According to an example embodiment, the non-RF RIC may communicate with the external source over the external interface. According to an embodiment, the non-RT RIC may communicate with the external EI source over an external enrichment information (EI) interface. According to an embodiment, the non-RT RIC may communicate with the external EI source over an external artificial intelligence (AI)/machine learning (ML) interface. According to an embodiment, the non-RT RIC may communicate with a local craft terminal over an external human machine (HM) interface.

Figure 12D:
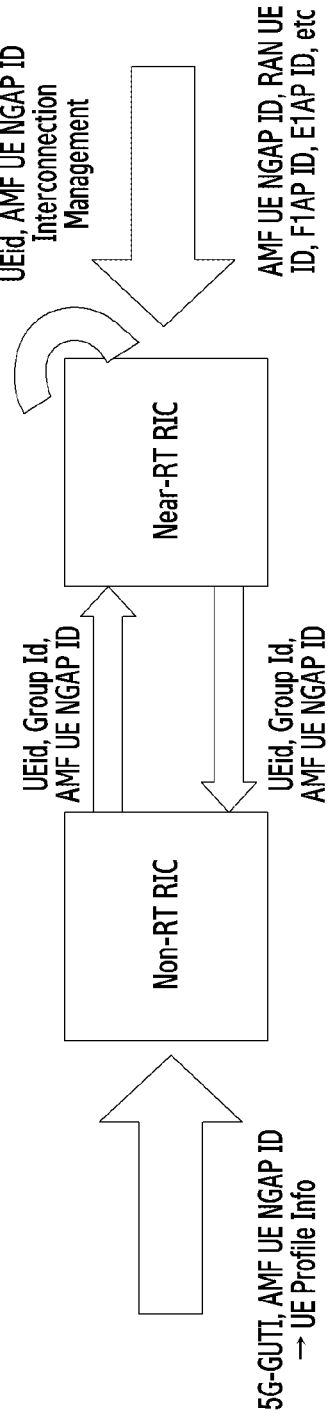
FIG. 12D illustrates an example of UE identifier management between a non-RT RIC and a near-RT RIC according to embodiments of an example embodiment.

FIG. 12D illustrates an example of UE ID management between the non-RT RIC and the near-RT RIC according to an example embodiment. The O-RAN has delivered the UE ID information (e.g., RAN EU ID, AMF EU NGAP ID) through an E2 message, for efficient management (e.g., performance measurement, event, radio resource management) between the near RT RIC and the E2 node. For efficient operations between the non-RT RIC and the near- RT RIC, the non-RT RIC is required to configure the A1 policy on the UE basis. In so doing, it is required to consistently manage the UE ID information provided to the RAN. For doing so, the non-RT RIC and the near RT RIC may transmit or receive the UE ID information over the A1 interface. Hereafter, certain example embodiments discuss the A1 interface policy between the non-RT RIC and the near RT RIC.

The UE is connected to one of a gNB, a gNB-DU, or a gNB-CU which is the E2 node, and thus accesses the 5GC. Hence, radio resources of the UE are controlled by the 5GC. The E2 node accessed by the UE is connected with the O-RAN over the E2 interface, the A1 interface, or the O1 interface, but a difference may occur between the UE ID managed in the O-RAN and the UE ID managed in the 5GC. To address this difference, the core network (e.g., the 5GC) (or an operating support system (OSS)/base station subsystem (BSS)) according to an example embodiment may provide UE related information to the SMO (non-RT RIC). According to an embodiment, the UE related information may include the UE ID information on the core network mapped to the RAN (the E2 node). Also, according to an embodiment, the UE related information may include UE profile information. The UE profile information may be defined for each O-RAN use case. For example, the UE profile information may include service level agreement (SLA) profile information. Also, for example, the UE profile information may include QoS profile information. In addition, for example, the UE profile information may include technical specification (TS) profile information. According to an example embodiment, the non-RT RIC and the near RT RIC may share one common identifier with the core network (e.g., the 5GC) (or OSS/BSS), and thus correlate the UE ID of the O-RAN and the UE ID of the 3GPP core network.

Referring to FIG. 12D, the non-RT RIC may obtain the UE profile information (e.g., 5G-GUTI, AMF UE NGAP ID). The near-RT RIC may obtain the UE ID, the AMF UE NGAP ID, an F1AP ID, a RAN UE ID, an E1AP ID and so on through the E2 node or other server. The non-RT RIC and the near RT RIC may transmit or receive the UE ID information. The non-RT RIC and the near RT RIC may share the UE ID information. According to an embodiment, the non-RT RIC may transmit at least one of the UE ID, the group ID, the AMF UE NGAP ID to the near-RT RIC. Also, according to an embodiment, the near-RT RIC may transmit at least one of the UE ID, the group ID, the AMF UE NGAP ID to the non-RT RIC. Herein, the group ID may be defined according to an embodiment to be described. For example, the group ID may include a radio access technology/frequency selection priority (RFSP). Also, for example, the group ID may include a subscriber profile ID (SPID).

Figure 13A:
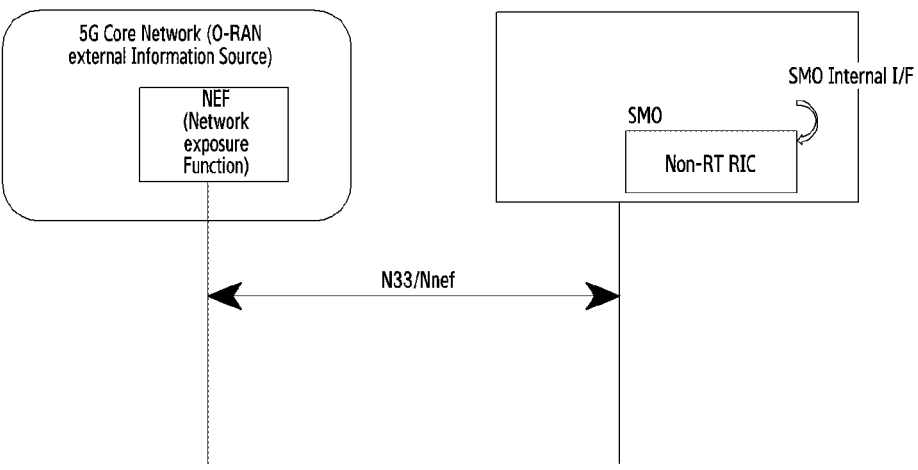
FIG. 13A illustrates an example of an interface between a SMO and a 5G core network according to an example embodiment.

FIG. 13A illustrates an example of an interface between an SMO and a 5G core network according to an example embodiment. FIG. 13A illustrates an interoperating N33/Nnef interface between the 5G core network and the O-RAN SMO and an O-RAN deployment example specified in the standard according to an example embodiment. Between the O-RAN and the 5G core network, the 5GC may communicate with the non-RT RIC residing in the SMO over a service based interface (SBI) through the network exposure function defined in the 3GPP.

FIG. 13A illustrates that the NEF and the SMO communicate through the N33/Nnef, but an example embodiment may be also applied to deployment in which the 5GC and the O-RAN are connected through a $3^{rd}$ party entity. That is, the NEF of the 5GC may be connected with the $3^{rd}$ party entity over the N33/Nnef interface, and the $3^{rd}$ party entity may be connected with the O-RAN (e.g., the SMO, the non-RT RIC). This deployment may be understood as an example embodiment. In other words, signaling between the 5GC and the SMO to be described may include not only the signaling between the NEF of the 5GC and the non-RT RIC of the SMO, but also signaling between the NEF and the SMO via the $3^{rd}$ party entity.

Figure 13B:
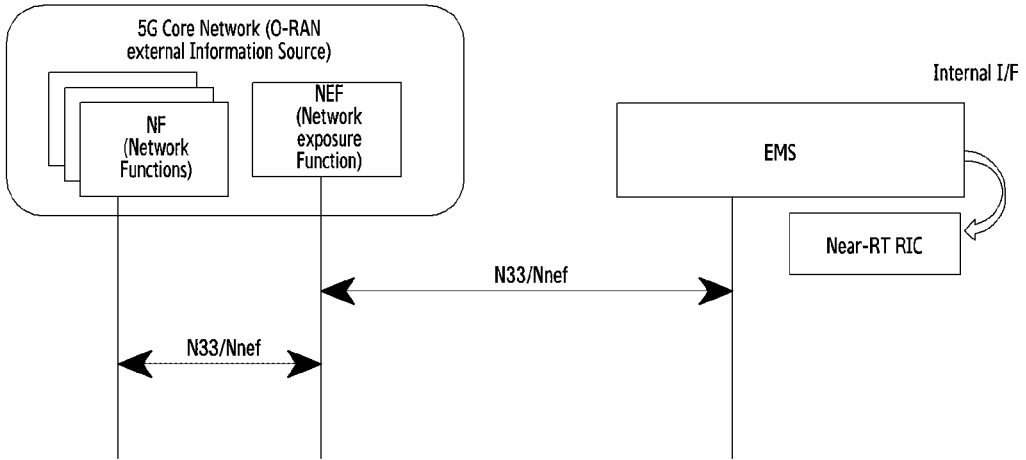
FIG. 13B illustrates an example of an interface between an element management system (EMS) and a 5G core network according to an example embodiment.

FIG. 13B illustrates an example of an interface between an element management system (EMS) and the 5G core network according to an example embodiment. The near-RT RIC connected with the 5G core network specified in the standard according to an example embodiment and a conventional EMS based management system may communicate with the EMS and the near-RT RIC with the network exposure function defined in the 3GPP over the N33/Nnef interface. The O-RAN deployment is illustrated as an example, as the external entity communicating with the NEF.

FIG. 13B illustrates that the NEF and the EMS communicate through the N33/Nnef, but an example embodiment may be also applied to the deployment in which the 5GC and the O-RAN are connected via the $3^{rd}$ party entity. That is, the NEF of the 5GC may be connected with the $3^{rd}$ party entity over the N33/Nnef interface, and the $3^{rd}$ party entity may be connected with the O-RAN (e.g., the EMS, the near-RT RIC). This deployment may be understood as an example embodiment. In other words, signaling between the 5GC and the EMS to be described may include not only the signaling between the NEF of the 5GC and the EMS, but also the signaling between the NEF and the EMS via the $3^{rd}$ party entity.

Figure 14A:
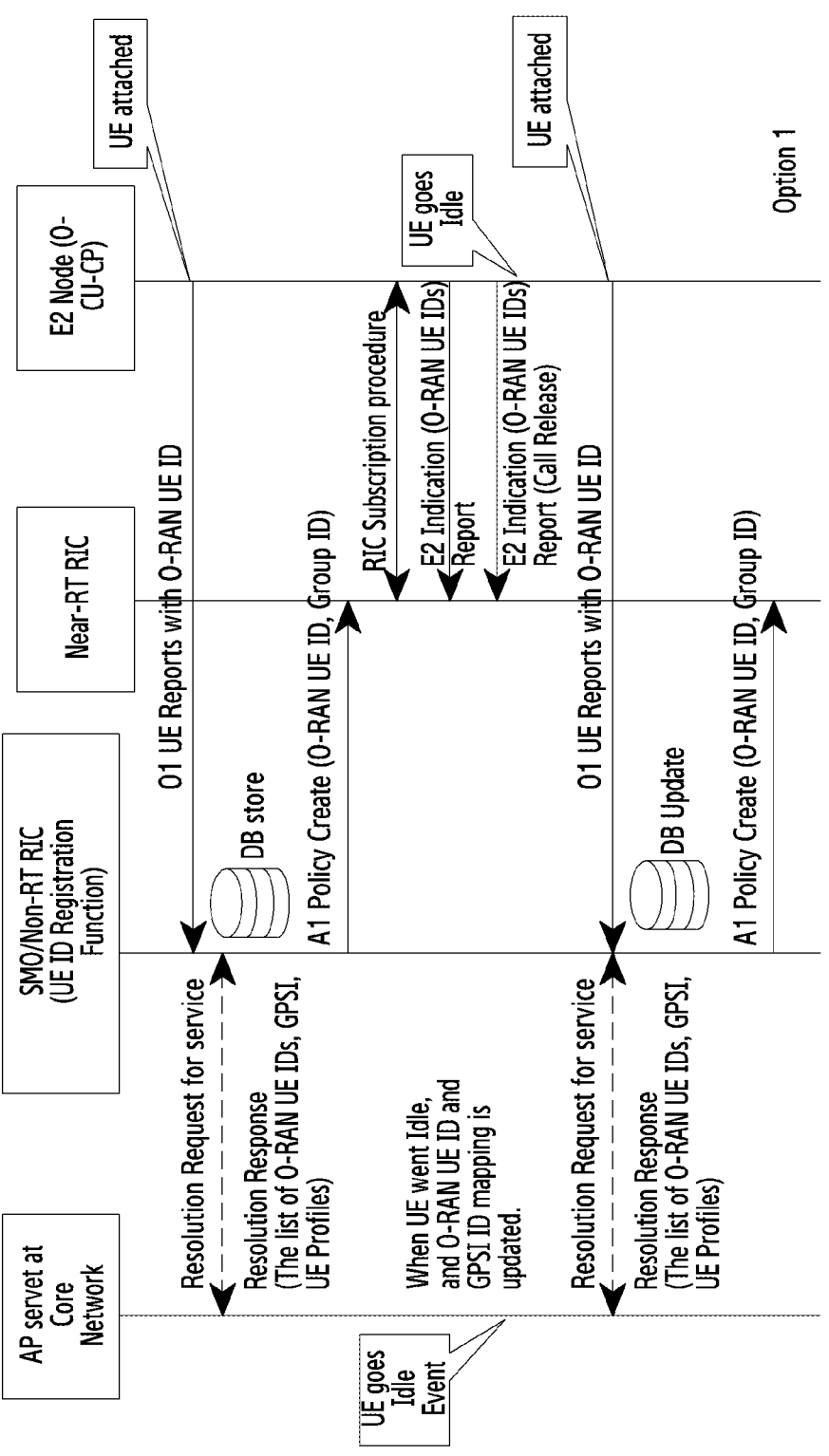
FIG. 14A illustrates a first example of signaling for sharing a UE identifier between a 3rd generation partnership project (3GPP) 5G core network (5GC) and a near-RT RIC, through a non-RT RIC according to an example embodiment.

FIG. 14A illustrates a first example of signaling for sharing a UE ID between a 3GPP 5GC and a near-RT RIC, through a non-RT RIC according to an example embodiment. FIG. 14A illustrates the embodiment that the O-CU-CP (E2 node) transmits an O-RAN UE ID to the SMO/non-RT RIC over the O1 interface, according to an example embodiment. FIG. 14A describes an application (AP) server included in the core network (e.g., the 5GC of 3GPP) by way of example, but embodiments of the present disclosure are not limited thereto. Instead of the AP server, the NEF of the 5GC may communicate with the SMO of the O-RAN as shown in FIGS. 13A and 13B. That is, the signaling between the AP server and the SMO may be applied to communication between the NEF and the SMO or communication between the NEF-$3^{rd}$ party-SMO in the same manner.

If the UE is attached to the AMF, the E2 node (O-CU-CP) receives an initial context setup request from the AMF. The received initial context setup request message may include an AMF UE NGAP ID, a GUAMI, and an RFSP value indicating a UE group.

Referring to FIG. 14A, the E2 node (O-CU-CP) may forward the received UE ID related parameters to the SMO/non-RT RIC with an O1 interface message. The non-RT RIC receiving the O-RAN UE ID related parameters from the E2 node may store the information in the database. In addition, the SMO/non-RT RIC may forward the O-RAN UE ID (e.g., AMF UE NGAP ID, GUAMI) received from the E2 node to the network exposure function of the core network based on the N33/Nnef interface specified in the 3GPP standard, using an external interface supported in the SMO. The core network entity (e.g., the AP server) may find the AMF indicated by the GUAMI, and thus identify a GPSI which is open to outside in the core network of the UE indicated by the connected AMF UE NGAP ID of the corresponding AMF. The core network entity (e.g., the NEF) may forward related UE profile information and the GPSI to the SMO/non-RT RIC. The NEF may transfer the AMF UE NGAP ID and the GUAMI (or, in addition, a group ID) of the 5GC, related to the GPSI, to the SMO/non-RT RIC. The UE identify management function of the SMO/non-RT RIC may store the received AMF UE NGAP ID related to the GPSI in the data base. An embodiment of the GPSI storing database of the UE identity management function is shown in the following FIG. 14B.

Figure 14B:
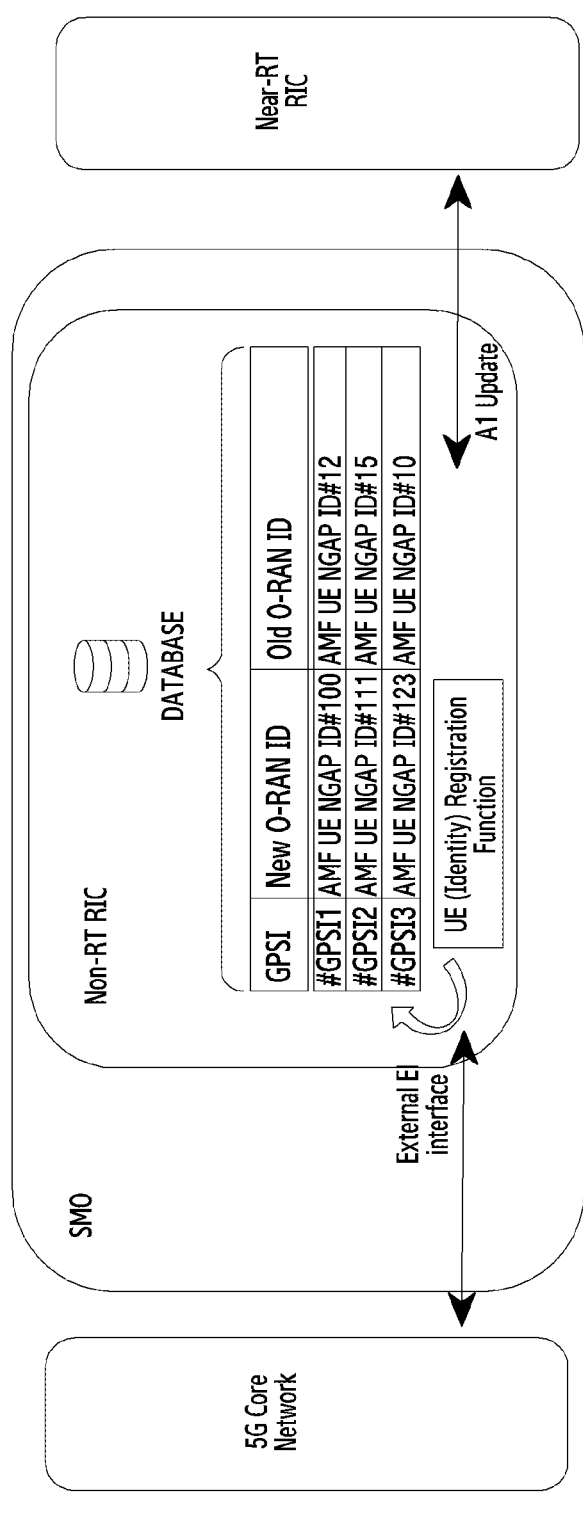
FIG. 14B illustrates an example of UE identifier management in a non-RT RIC according to an example embodiment.

FIG. 14B illustrates an example of UE ID management in the non-RT RIC according to an example embodiment. According to an embodiment, the non-RT RIC may obtain UE ID related information from the 5GC over an external interface (e.g., an external E1 interface). In addition, according to an embodiment, the non-RT RIC may obtain UE ID related information from the near-RT RIC through A1 update. The non-RT RIC may store the obtained information in the data base. Thus, even if the UE is attached to and released from the AMF, the non-RT RIC may map a previous O-RAN ID (or an old O-RAN ID) to a current O-RAN ID (or a new O-RAN ID) through the GPSI. That is, through the information stored in the database, the non-RT RIC may map the GPSI and the O-RAN ID, to make no difference between the UE ID managed in the core network of the 3GPP and the managed UE ID of the O-RAN. For example, the non-RT RIC may generate a policy for AMF UE NGAP ID #100, using a policy according to AMF UE NGAP ID #12 previously generated. In addition, for example, the non-RT RIC may create a policy for AMF UE NGAP ID #111, using a policy according to AMF UE NGAP ID #15 previously generated. In addition, for example, the non-RT RIC may create a policy for AMF UE NGAP ID #123, using a policy according to AMF UE NGAP ID #10 previously generated.

The SMO/non-RT RIC may generate the AMF UE NGAP ID indexed with the GPSI stored in the database and the GUAMI as an A1 policy create message. The non-RT RIC may transfer the generated A1 policy create message to the near-RT RIC. The A1 policy create message may include the following UE ID of an example embodiment as a RESULT-FUL message specified in the O-RAN standard. For example, the definition of the O-RAN UE ID may be defined as the following table 1.

TABLE 1

| O-RAN UE definition | | | |
|---|---|---|---|
| Type Name | Type Definition | Description | Applicability |
| UeId | object | O-RAN UE ID | identifies a single UE |

For example, a data structure of the UE ID may be defined as the following table 2.

TABLE 2

| O-RAN UE data structure definition | | | | | |
|---|---|---|---|---|---|
| Attribute Name | Data Type | P | Cardi-nality | Descrip-tion | Applicability |
| amfUeNgapId | number | M | 1 | | |
| guami | string | M | 1 | | |
| rfsp | number | M | 1 | | |

Table 2 shows the AMF UE NGAP ID, the GUAMI, and the RFSP as the example of the O-RAN UE ID, but it is noted that other ID information related to the corresponding UE in other O-RAN than the above examples may be applied. According to an embodiment, the O-RAN UE ID may further include at least one of F1AP ID, E1AP ID, or RAN UE ID besides the above ID. In addition, according to an embodiment, the O-RAN UE ID may further include at least one of MME UE S1AP ID, global unique MME ID (GUMMEI), M-NG-RAN node UE XnAP ID, global gNB ID, gNB-CU UE F1AP ID, gNB-CU UE E1AP ID, gNB-CU-CP UE E1AP ID, gNB-CU-CP UE E1AP ID, RAN UE ID, MeNB UE X2AP ID, alobal eNB ID, or ng-eNB-CU UE W1AP ID besides the above ID. In addition, according to an embodiment, the O-RAN UE ID may further include at least one of peer Xn gNB ID/X2 eNB ID in a DC situation besides the above ID. In addition, according to an embodiment, the O-RAN UE ID may further include a transport ID besides the above ID.

Table 3 shows an example of the A1 policy create message used to transfer the O-RAN UE ID of an example embodiment to the near-RT RIC.

TABLE 3

| A1 policy create UE ID message example | | | |
|---|---|---|---|
| Method | Path | Request (updated) | Response |
| PUT | {apiRoot}/A1-P/v2/policytypes/{policyTypeId}/policies/{policyId}(PolicyObject) | {<br>"scope": {<br>  "ueId": {<br>    "amfUeNgapId": 100,<br>    "guami": "1001010...100",<br>    "rfsp": 10<br>  },<br>  "qosId": 67<br>},<br>"qosObjectives": {<br>  "priorityLevel": 50<br>}<br>} | 201 Created (PolicyObject) |

The non-RT RIC may transfer to the RIC the policy for the near-RT RIC to control the E2 node using the A1 interface. The A1 interface may be defined between the non-RT RIC and the near RT RIC. The A1 policy may include at least one of UE policy, group policy, cell policy, or a slice policy, and may be variously configured on a service basis. The RIC may perform a RIC subscription procedure based on the A1 policy received with the A1 policy message. The A1 policy create message may include, for example, a JavaScript object notation (JSON) message format. For example, if a policy for a specific UE is configured, the A1 policy create message may include the UE ID. Also, for example, if a policy for a specific UE is configured, the A1 policy create message may include a cell ID. In addition, for example, if the QoS is controlled, the A1 policy create message may include a guaranteed bit rate (GBR) related to the QoS.

If receiving the A1 policy create message from the non-RT RIC, the near-RT RIC may store it in the database. The near-RT RIC may generate and transmit to the E2 node a RIC subscription message generating the O-RAN UE ID received from the non-RT RIC based on the O-RAN UE ID. The E2 node receiving the RIC subscription message may operate based on an event trigger definition defined in the subscription message. Next, if an event designated in the event trigger definition occurs, the E2 node may transmit an E2 indication message to the near-RT RIC. The transmitted E2 indication message is generated at the near-RT RIC for each O-RAN UE ID. If the UE releases a call, the E2 node transmits the E2 indication message, and the transmitted message delivers the UE call release designated in the O-RAN UE ID to the near-RT RIC.

If receiving a call after the call release, or requiring transmission, the UE re-attempts the call attach to the AMF. If the UE is re-attached to the AMF, the E2 node (O-CU-CP) newly receives an initial context setup request from the AMF. The initial context setup request message newly received may include a new AMF UE NGAP ID, a new GUAMI, and an RFSP value indicating the UE group. The O-CU-CP may re-forward the received UE ID related parameters to the SMO/non-RT RIC with an O1 interface message.

In the same manner as the aforementioned operation, the SMO/non-RT RIC may forward the O-RAN UE ID (AMF UE NGAP ID, GUAMI) received from the E2 node to the network exposure function of the core network based on the N33/Nnef interface specified in the 3GPP standard, using the external interface (e.g., the external E1 interface) supported in the SMO. The NEF may identify the AMF indicated by the GUAMI. The NEF may identify the GPSI which is open to outside in the core network of the UE indicated by the connected AMF UE NGAP ID of the corresponding AMF. The NEF may transfer the related UE profile information and the GPSI to the SMO/non-RT RIC. The UE identify management function of the SMO/non-RT RIC may search the database for the old O-RAN UE ID (old AMF UE NGAP ID) using the received GPSI, and store it with the newly received AMF UE NGAP ID. Using the described procedure, the SMO/non-RT RIC tracks the O-RAN UE ID (AMF UE NGAP ID) which continuously changes if the UE changes to idle and consistently manages mobility information, location information, and performance measurement information of the UE for a long time. Even if the AMF changes according to the UE movement, it is easy to track the corresponding UE and thus the management performance of the corresponding UE may be improved.

Figure 14C:
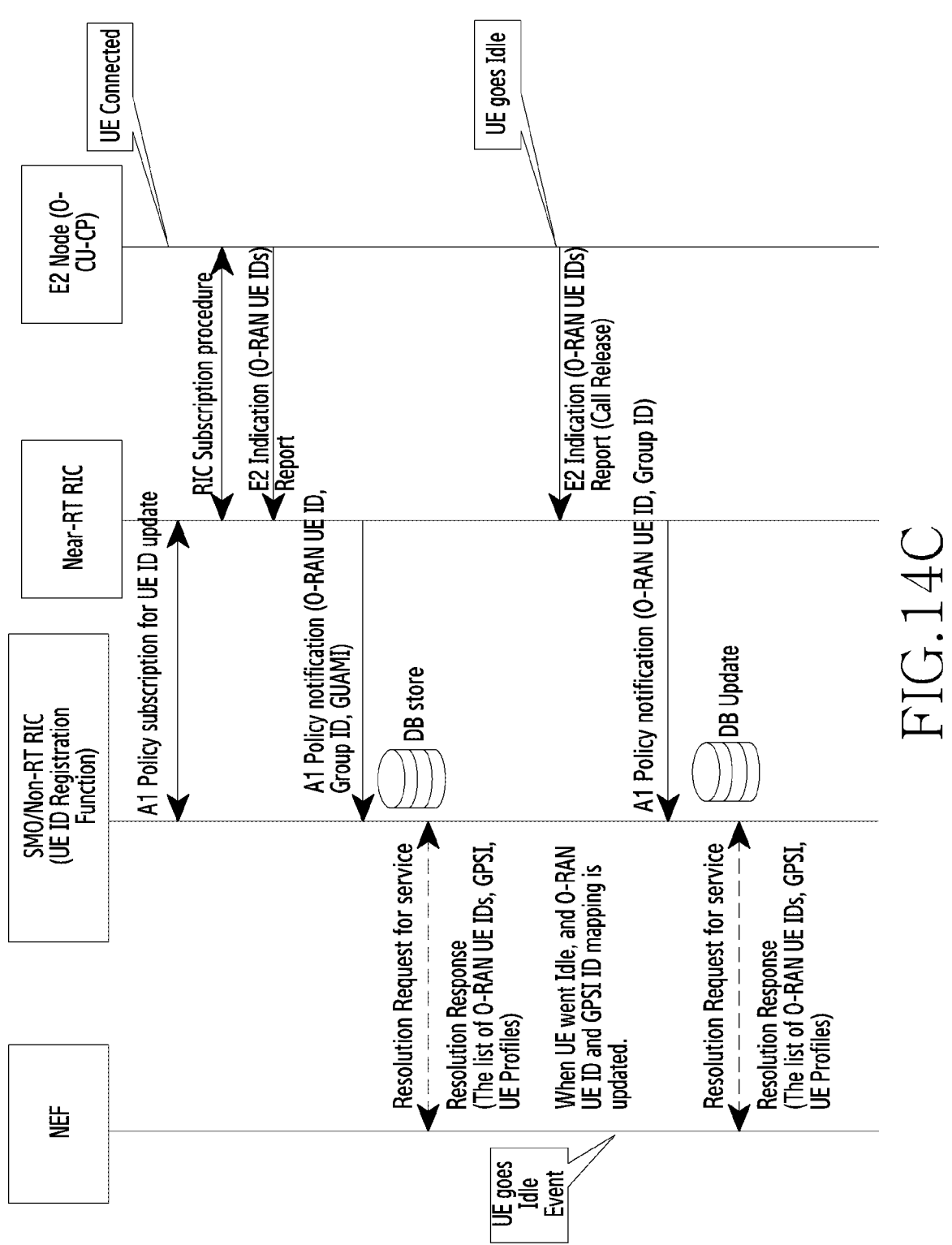
FIG. 14C illustrates a second example of signaling for sharing a UE identifier between a 3GPP 5GC and a near-RT RIC, through a non-RT RIC according to an example embodiment.

FIG. 14C illustrates a second example of signaling for sharing the UE ID between the 3GPP 5GC and the near-RT RIC, through the non-RT RIC according to an example embodiment. FIG. 14C illustrates an embodiment that the O-CU-CP (E2 node) transmits the O-RAN UE ID to the SMO/non-RT RIC over the A1 interface, as another embodiment. If the system operates to commence O-RAN service provision, the SMO/non-RT RIC transmits an A1 policy subscription for UE ID update message to every connected near-RT RIC. The A1 policy subscription for UE ID update message is a RESTFUL message specified in the O-RAN standard and is a service subscription message transmitted by the non-RT RIC to the near-RT RIC to receive UE ID notification in an example embodiment. For example, the A1 message format may be defined as the following table 4.

TABLE 4

UE ID notification subscribe message format

| URI (example) | Method | Description |
|---|---|---|
| /nearRtRic/ueId/subscriptions | POST | Create a new subscription |
| /nearRtRic/ueId/subscriptions/{subscription_id} | GET | Get the subscription |
| /nearRtRic/ueId/subscriptions/{subscription_id} | DELETE | Delete an individual subscription |

The A1 policy subscription message may include a group ID defined in the O-RAN. The near-RT RIC receiving the A1 policy subscription UE ID update message may request the UE ID from the E2 node. The near-RT RIC may prepare to store the UE ID in the database. The near-RT RIC may generate a RIC subscription message, transmit the generated RIC subscription message to the E2 node, and thus start an E2 RIC subscription procedure. The E2 RIC subscription message may configure event trigger definition to an E2 group ID, and performs on every UE satisfying the event trigger definition condition if the group ID is not configured. The E2 node transmits an E2 indication message to the near-RT RIC if an event designated in the event trigger definition occurs, and the transmitted E2 indication message delivers the O-RAN UE ID list to the near-RT RIC.

The near-RT RIC receiving the O-RAN UE ID list stores the received UE ID list in the database, and generates and transfers an A1 policy notification message to the non-RT RIC. An example of the A1 policy notification message is illustrated in Table 5.

TABLE 5

A1 Policy Notification message format

| URI | Method | Description |
|---|---|---|
| (subscriber-provided) | POST | Notifies UE ID update information |

The non-RT RIC receiving the O-RAN UE ID related parameters from the E2 node may store the information in the database. In addition, the SMO/non-RT RIC may forward the O-RAN UE ID (AMF UE NGAP ID, GUAMI) received from the E2 node to the network exposure function of the core network based on the N33/Nnef interface specified in the 3GPP standard, using the external interface supported in the SMO. The NEF may identify the AMF indicated by the GUAMI. The NEF may identify the GPSI which is open to outside in the core network of the UE indicated by the connected AMF UE NGAP ID of the corresponding AMF. The NEF may transfer UE profile information related to the corresponding GPSI and the GPSI to the SMO/non-RT RIC. The NEF may forward the AMF UE NGAP ID and the GUAMI (or, in addition, the group ID) of the 5GC, related to the GPSI, to the SMO/non-RT RIC. The UE identify management function of the SMO/non-RT RIC may store the received AMF UE NGAP ID related to the GPSI in the data base. The embodiment of the GPSI storing database of the UE identity management function is shown in the following FIG. 14B.

If it is necessary to transmit the A1 policy to be required in a use case to the E2 node, the SMO/non-RT RIC may generate and transfer a create message to the near-RT RIC, using the AMF UE NGAP ID indexed with the GPSI stored in the database and the GUAMI. For example, using the O-RAN UE ID obtained in the previous procedure and the UE profile information indicated by the UE ID, the non-RT RIC uses traffic steering, QoS optimization, service level agreement optimization, and RAN slicing defined in the O-RAN standard for the UE control.

Next, an E2 indication message is transmitted to the near-RT RIC if a designated event that the UE call is released occurs, and the transmitted E2 indication message delivers the UE ID list of the O-RAN call release to the near-RT RIC. The near-RT RIC may delete the UE list associated with the released call in the E2 node from the database. As the attach procedure/release procedure of the UE are repeated, the newly allocated UE ID list may be repeatedly performed, until the A1 UE ID update subscription policy is deleted.

Figure 14D:
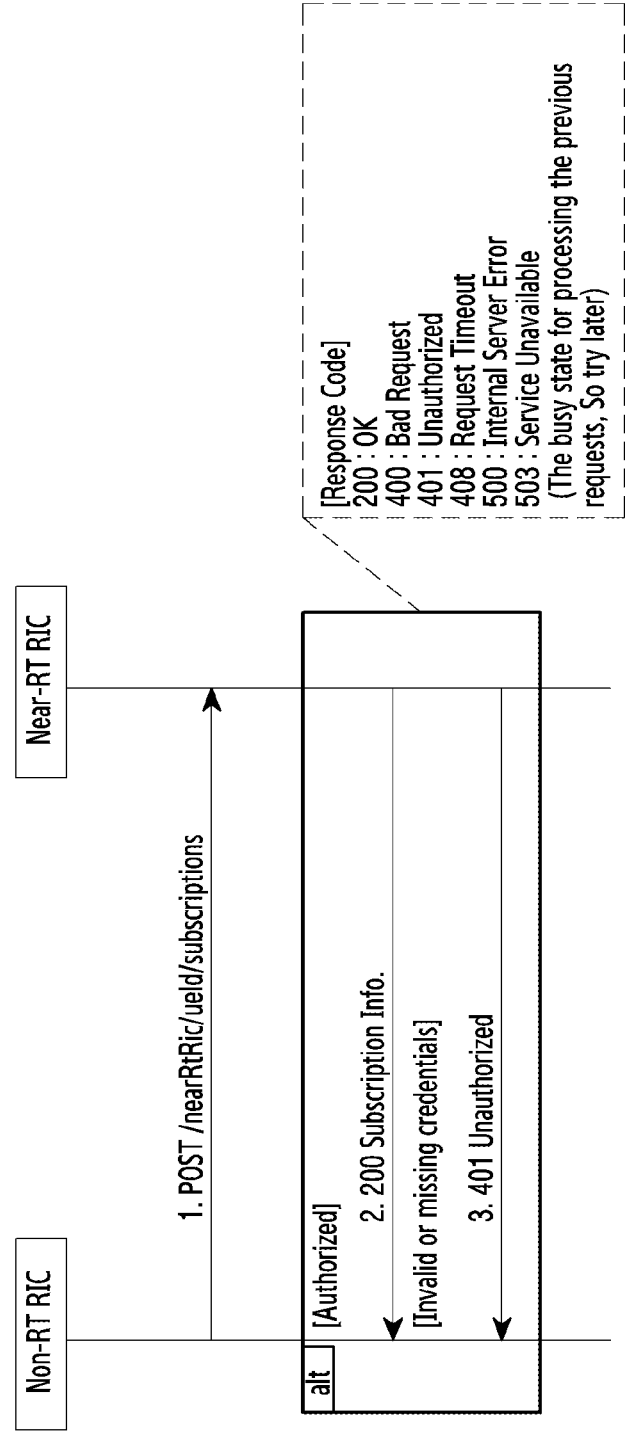
FIG. 14D illustrates an example of A1 policy transmission for subscription between a non-RT RIC and a near-RT RIC according to an example embodiment.

FIG. 14D illustrates an example of A1 policy transmission for subscription between the non-RT RIC and the near-RT RIC according to an example embodiment. In step 1, the non-RT RIC may transmit an A1 policy create message to the near-RT RIC. According to an embodiment, in step 2, the non-RT RIC may transmit a response according to acceptance to the near-RT RIC. In so doing, the non-RT RIC may transmit subscription information. According to another embodiment, in step 3, the non-RT RIC may transmit a rejection or unauthorized response unlike step 2.

Figure 14E:
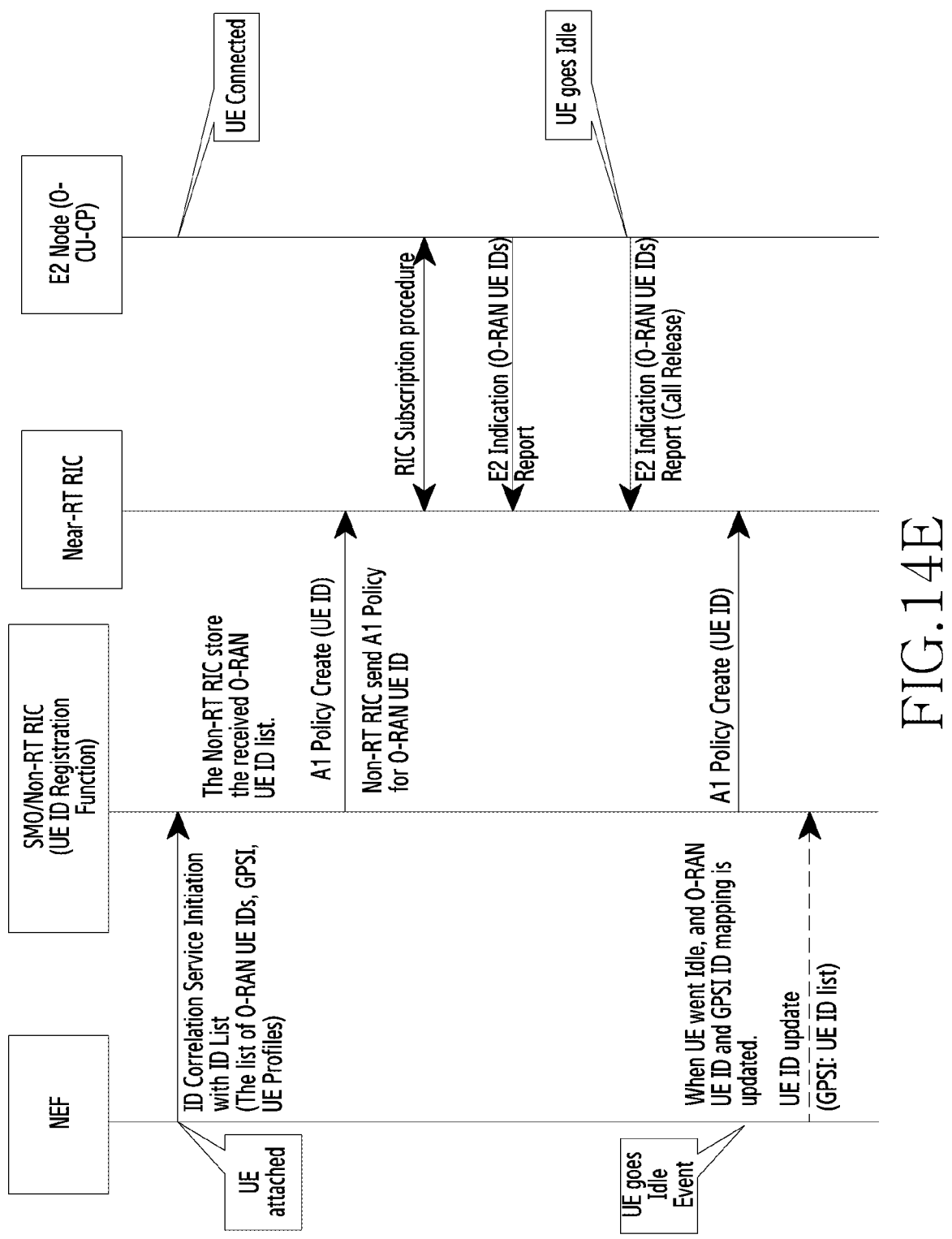
FIG. 14E illustrates a third example of signaling for sharing a UE identifier between a 3GPP 5GC and a near-RT RIC, through a non-RT RIC according to an example embodiment.

FIG. 14E illustrates a third example of signaling for sharing the UE ID between the 3GPP 5GC and the near-RT RIC, through the non-RT RIC according to an example embodiment.

FIG. 14E illustrates that the application server residing in the core network commences a service, as another embodiment. If the UE is attached to the RAN, the AMF may generate and transfer the AMF UE NGAP ID, the GUAMI, the RFSP value indicating the UE group to the E2 node (e.g., O-CU-CP, gNB). If the UE is attached, the application server collects UE information from the AMF/unified data repository (UDR) and commences ID correlation service initiation at the SMO/non-RT RIC. A correlation service initiation message may include the GPSI which is open to the outside in the core network of the UE indicated by the connected AMF UE NGAP ID of the AMF, and the UE profile information. The correlation service initiation message, that is, the GPSI and the UE profile information are transferred from the network exposure function of the core network to the SMO/non-RT RIC based on the N33/Nnef interface specified in the 3GPP standard, using the external interface supported in the SMO. The AMF UE NGAP ID, and the GUAMI (or, in addition, the group ID) of the 5GC, related to the GPSI are transferred from the network exposure function of the core network to the SMO/non-RT RIC. The UE identify management function of the SMO/non-RT RIC stores the received AMF UE NGAP ID related to the GPSI in the data base. The embodiment of the GPSI storing database of the UE identity management function is shown in FIG. 14B.

The SMO/non-RT RIC generates the AMF UE NGAP ID indexed with the GPSI stored in the database and the GUAMI as an A1 policy create message and transfers it to the near-RT RIC. The A1 policy create message may include the following UE ID of an example embodiment as the RESULTFUL message specified in the O-RAN standard (e.g., see the table 1 and the table 2).

If receiving the A1 policy create message from the non-RT RIC, the near-RT RIC may store it in the database. The near-RT RIC may generate a RIC subscription message based on the O-RAN UE ID received from the non-RT RIC. The near-RT RIC may transmit the RIC subscription message generated based on the O-RAN UE ID to the E2 node. The E2 node receiving the RIC subscription message may operate based on the event trigger definition defined in the subscription message. Next, if an event designated in the event trigger definition occurs, the E2 node may transmit an E2 indication message to the near-RT RIC. The transmitted E2 indication message is generated at the near-RT RIC for each O-RAN UE ID. If the UE releases a call, the E2 node transmits the E2 indication message to the near-RT RIC, and the transmitted message indicates that the UE designated in the O-RAN UE ID releases the call.

If receiving a call after the call release, or requiring transmission, the UE re-attempts the call attach to the AMF, and repeats the correlation service initiation operation at the application server residing in the core network.

FIG. 14A through FIG. 14E illustrate that the near RT RIC and the E2 node are separate nodes, but embodiments of the present disclosure are not limited thereto. According to an embodiment, the E2 node is the O-CU-CP, and the O-CU-CP and the near RT RIC may be implemented in one equipment. At this time, signaling between the O-CU-CP and the near RT RIC may be applied as internal operations or may be omitted. That is, embodiments of the present disclosure do not exclude implementation which functionally includes the near RT RIC in a CU device.

Figure 15:
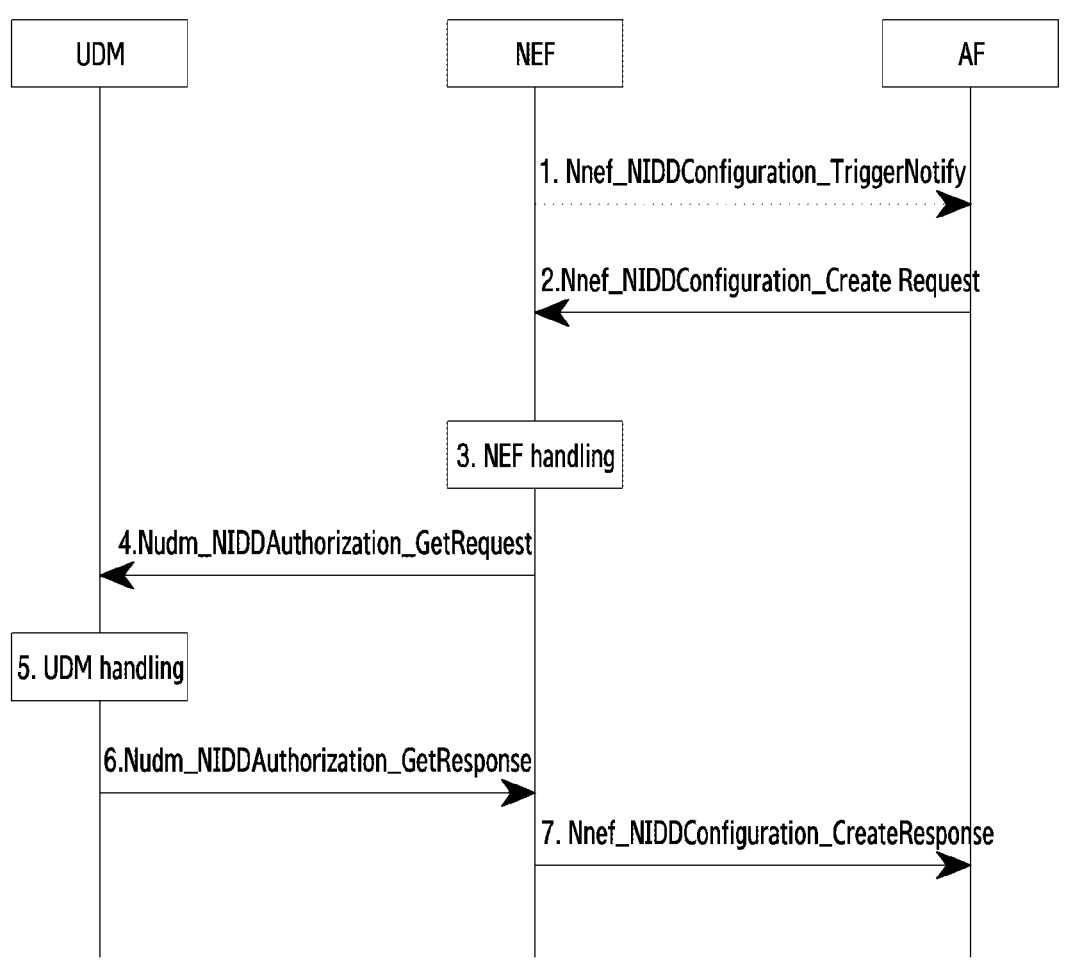
FIG. 15 illustrates an example of signaling for providing a UE identifier to an external source in a 3GPP 5GC according to an example embodiment.

FIG. 15 illustrates an example of signaling for providing a UE ID to an external source in a 3GPP 5GC according to an example embodiment. FIG. 15 illustrates the example that the NEF of the 5GC provides a GPSI and a UE related profile to the SMO. A procedure shown in FIG. 15 is merely an example of the procedure for the 5GC to provide the UE ID to the SMO of the O-RAN, is not interpreted as limiting other embodiments of the present disclosure.

Referring to FIG. 15, if the NEF needs an IDD configuration according to a specific AF, the NEF may transmit a Nnef_NIDDConfiguration_TriggerNotify (GPSI, AF ID, NEF ID) message to the AF and thus request a Nnef_NIDD-Configuration_Create request for the UE identified by the GPSI. The AF may transmit a Nnef_NIDDConfiguration-_Create message to the NEF. The procedure shown in FIG. 15 is a non-IP data delivery (NIDD) configuration procedure defined in 3GPP TS 23.502. The NIDD configuration procedure shown in FIG. 15 is triggered by the NEF, and its detailed explanation shall refer to 3GPP TS 23.502. The AF of FIG. 15 may function as the SMO (or the non-RT RIC) of the O-RAN.

Figure 16:
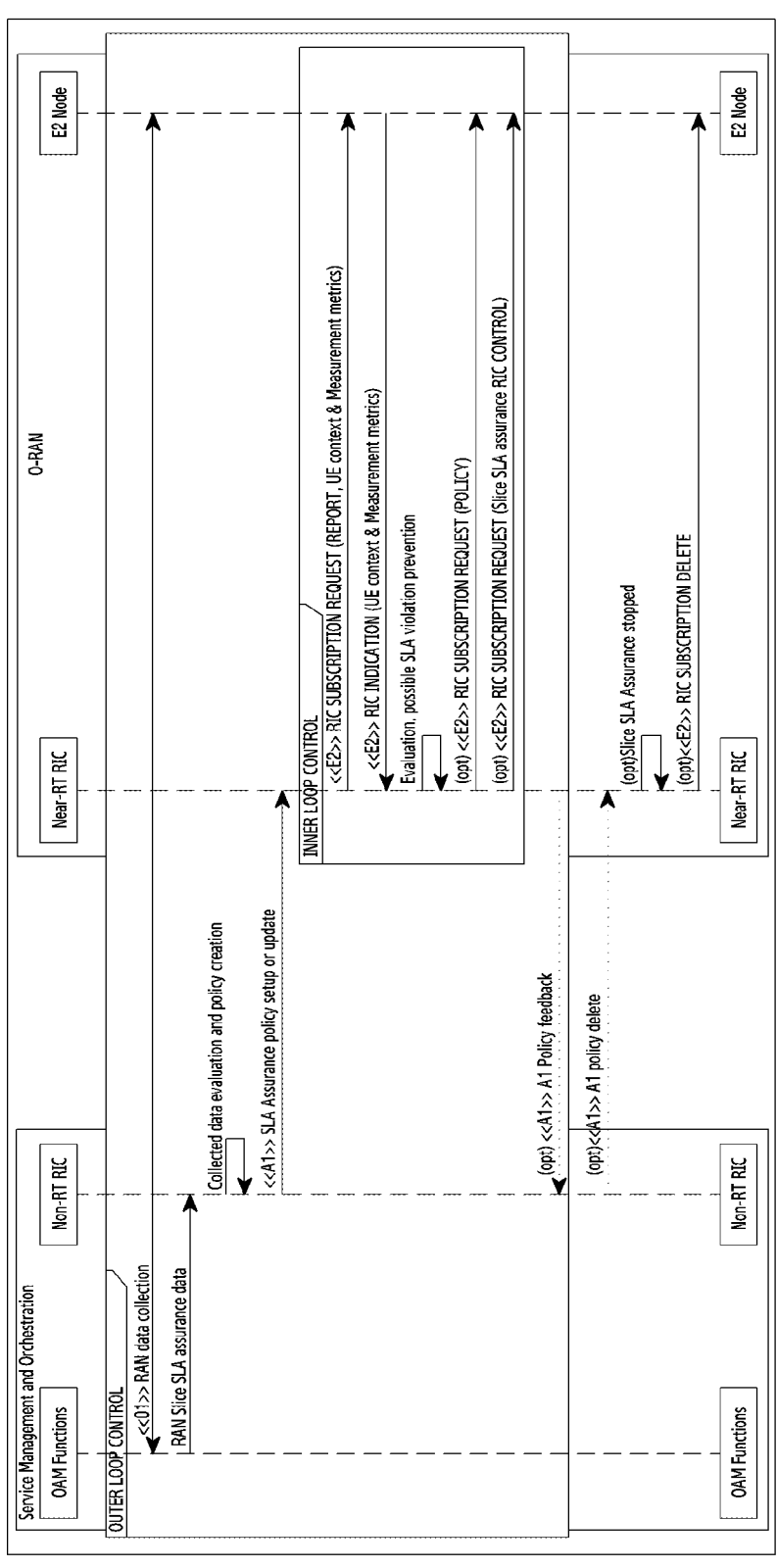
FIG. 16 illustrates an example of service level agreement (SLA) assurance according to an example embodiment.

FIG. 16 illustrates an example of SLA assurance according to an example embodiment. As mentioned in FIG. 12A through FIG. 15, at the non-RT RIC, by defining and storing the mapping relation of the UE ID managed in the core network of the 3GPP and the UE ID managed in the O-RAN, the non-RT RIC may not only obtain more various UE data, but also provide more efficient service to the UE. FIG. 16 is a diagram for explaining technical advantages according to the operations described in FIG. 12A through FIG. 15, and operations shown in FIG. 16 are not interpreted as limiting other embodiments.

The SLA is an agreement concluded to provide a predefined level service through a commitment between a communication service provider and a client. If not reaching the service provision level or not meeting the predefined level on a periodic basis or for a specific time duration, the SLA compensates the client for some of communication fees based on the agreement. To guarantee this SLA achievement, SLA assurance may be used in the O-RAN.

Referring to FIG. 16, an OAM function of the SMO may collect data from the E2 node. Herein, the data may indicate wireless network, that is, RAN data. The OAM function of the SMO may collect the data from the E2 node over the O1 interface. The data collection may be performed on a user basis, that is, on a UE ID basis. The OAM function of the SMO provides data of RAN slice SLA assurance to the non-RT RIC. According to an embodiment, the RAN slice SLA assurance data may be generated based on the GPSI. The non-RT RIC may collect data and create a policy, based on the information received from the OAM function. The non-RT RIC may transfer an A1 policy create message (or A1 policy setup, A1 policy update message) indicating the created policy to the near-RT RIC. Next, the near-RT RIC may provide an SLA assurance service over the internal E2 interface.

An example embodiment has the GUTI, the 5G GTUI, the AMF UE NGAP ID, the GUMME GUAMI and so on, as the UE ID defined in the 5GC or the O-RAN. The UE ID indicates the UE identity defined in the corresponding standard.

The GUTI may be an identifier for uniquely identifying the UE in the MME. It is configured as <GUTI>=<GUMMEI><M-TMSI>, wherein <GUMMEI>=<MCC><MNC><MME Identifier> and <MME Identifier>=<MME Group ID><MME Code>.

| | | GUTI | | |
|---|---|---|---|---|
| | | GUMMEI | | M-TMSI (32) |
| MCC | MNC | MME Identifier | | |
| (3 digit) | (3 digit) | MME Group ID | MME code | |
| | | (16 bits) | (8 bits) | |
| | | | | S-TMSI |

The 5G-GUTI may be an identifier for uniquely identifying the UE in the AMF. It is configured as <5G-GUTI>=<GUAMI><5G-TMSI>, wherein <GUAMI>=<MCC><MNC><AMF Identifier> and <AMF Identifier>=<AMF Region ID><AMF Set ID><AMF Pointer>.

| | | 5G-GUTI | | | |
|---|---|---|---|---|---|
| | | GUAMI | | | 5G- |
| MCC | MNC | AMF Identifier | | | TMSI |
| (3 digit) | (3 digit) | AMF Region | AMF Set | AMF | (32) |
| | | ID (8) | ID (10) | Pointer (6) | |
| | | | | 5G-S-TMSI | |

The 5G-S-temporary mobile subscriber identity (TMSI) is a shortened form of the 5G-GUTI enabling a more efficient radio signaling procedure (e.g., paging and service request). For a paging purpose, the mobile may be paged with the 5G-S-TMSI. The 5G-S-TMSI may include an AMF set ID, an AMF pointer and 5G-TMSI.

An example embodiment has the AMF UE NGAP ID, and the GUAMI by way of example, but the ID of an example embodiment may be replaced and applied within the identifier constituting 5G-GUTI (e.g., 5G-S TMSI, AMF identifier, the AMF set ID, the AMF pointer, etc.) or the identifier constituting GUTI (e.g., S TMSI, MME code, MME group ID, etc.), in some embodiments.

According to the RRM control of the RIC according to various embodiments of the present disclosure, an IPC cost may reduce. In particular, if the DU/CU/RIC are located in the same environment, a cost for message relay may be reduced. By performing everything except the message transfer, the RIC may solve a reciprocity problem according to operations between vendors. In addition, the intelligent function of the RIC may be upgraded, to replace a specific function between the DU and CU-UPs.

According to various embodiments, a method performed by a non-real time (RT) radio access network (RAN) intelligent controller (RIC) in a wireless communication system, the method comprising: obtaining, from an E2 node, first information related to user equipment (UE) identity of an open (O)-RAN; obtaining, from a network exposure function (NEF) of a 5th generation (5G) core network (5GC), second information related to the UE identity; generating an A1 policy message based on the first information and the second information; and transmitting the A1 policy message to a near-RT RIC via an A1 interface, wherein the first information includes a general public subscription identifier (GPSI), an access and mobility management function (AMF) UE next generation application protocol identity (NGAP) ID related to the 5GC, and a globally unique AMF ID (GUAMI) related to the 5GC, and wherein the second information includes an AMF UE NGAP ID related to the 5GC and a GUAMI related to the 5GC.

In one embodiment, the method further comprising: storing, in a data base, the first information obtained from the E2 node and the second information obtained from the NEF of the 5GC.

In one embodiment, the method further comprising: transmitting, to the NEF of the 5GC, the first information obtained from the E2 node, wherein the second information is generated based on the GPSI identified based on the first information.

In one embodiment, wherein the first information further includes radio frequency selection priority (RFSP) value associated with a group including the UE.

In one embodiment, wherein the A1 policy message includes at least one of a UE ID, a cell ID or a value of guaranteed bit rate (GBR) related to a quality of service (QoS), corresponding to a service to be applied.

In one embodiment, wherein the generating the A1 policy message based on the first information and the second information comprises: generating A1 policy message based on the GUAMI related to the 5GC and the AMF UE NGAP ID related to the 5GC, wherein the GUAMI related to the 5GC and the AMF UE NGAP ID related to the 5GC are mapped to the GPSI.

In one embodiment, wherein the A1 policy message includes javascript object notation (JSON) message format.

According to various embodiments, a method performed by a near-real time (RT) radio access network (RAN) intelligent controller (RIC) in a wireless communication system, the method comprising: transmitting, to a non-RT RIC, first information related to a user equipment (UE) identity obtained from an E2 node; and obtaining, from the non-RT RIC, an A1 policy message based on the first information and second information generated by a network exposure function (NEF) of a 5th generation (5G) core network (5GC), via an A1 interface, wherein the first information includes a general public subscription identifier (GPSI), an access and mobility management function (AMF) UE next generation application protocol identity (NGAP) identity (ID) related to the 5GC, and a globally unique AMF ID (GUAMI) related to the 5GC, and wherein the second information includes an AMF UE NGAP ID related to the 5GC and a GUAMI related to the 5GC.

In one embodiment, the method further comprising: storing, in a data base, the obtained A1 policy message; generating a RIC subscription message based on the A1 policy message; and transmitting, to the E2 node, the generated RIC subscription message.

In one embodiment, wherein the second information is generated based on the GPSI identified based on the first information.

In one embodiment, wherein the first information further includes radio frequency selection priority (RFSP) value associated with a group including the UE.

In one embodiment, wherein the A1 policy message includes at least one of a UE ID, a cell ID or a value of guaranteed bit rate (GBR) related to a quality of service (QoS), corresponding to a service to be applied.

In one embodiment, wherein the obtaining the A1 policy message based on the first information and the second information comprises: obtaining A1 policy message based on the GUAMI related to the 5GC and the AMF UE NGAP ID related to the 5GC, wherein the GUAMI related to the 5GC and the AMF UE NGAP ID related to the 5GC are mapped to the GPSI.

In one embodiment, wherein the A1 policy message includes javascript object notation (JSON) message format.

According to various embodiments, an apparatus for performing a non-real time (RT) radio access network (RAN) intelligent controller (RIC) in a wireless communication system, the apparatus comprising: at least one transceiver; and at least one processor operably coupled with the at least one transceiver, wherein the at least one processor is configured to: obtain, from an E2 node, first information related to user equipment (UE) identity of an open (O)-RAN, obtain, from a network exposure function (NEF) of a 5th generation (5G) core network (5GC), second information related to the UE identity, generate an A1 policy message based on at least the first information and the second information, and transmit the A1 policy message to a near-RT RIC via at least an A1 interface, wherein the first information includes a general public subscription identifier (GPSI), an access and mobility management function (AMF) UE next generation application protocol identity (NGAP) ID related to the 5GC and a globally unique AMF ID (GUAMI) related to the 5GC, and wherein the second information includes an AMF UE NGAP ID related to the 5GC and a GUAMI related to the 5GC.

According to various embodiments, an apparatus for performing a near-real time (RT) radio access network (RAN) intelligent controller (RIC) in a wireless communication system, the apparatus comprising: at least one transceiver; and at least one processor operably coupled with the at least one transceiver, wherein the at least one processor is configured to: transmit, to a non-RT RIC, first information related to a user equipment (UE) identity obtained from an E2 node; and obtain, from the non-RT RIC, an A1 policy message based on the first information and second information generated by a network exposure function (NEF) of a 5th generation (5G) core network (5GC), via an A1 interface, wherein the first information includes a general public subscription identifier (GPSI), an access and mobility management function (AMF) UE next generation application protocol identity (NGAP) identity (ID) related to the 5GC, and a globally unique AMF ID (GUAMI) related to the 5GC, and wherein the second information includes an AMF UE NGAP ID related to the 5GC and a GUAMI related to the 5GC.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the components included in the present disclosure are expressed in a singular or plural form. However, the singular or plural expression is appropriately selected according to a proposed situation for the convenience of explanation, the present disclosure is not limited to a single component or a plurality of components, the components expressed in the plural form may be configured as a single component, and the components expressed in the singular form may be configured as a plurality of components.

Meanwhile, while the specific embodiment has been described in the detailed explanations of the present disclosure, it will be noted that various changes may be made therein without departing from the scope of the present disclosure.

The invention claimed is:

1. A method performed by a non-real time (RT) radio access network (RAN) intelligent controller (RIC) in a wireless communication system, the method comprising:

obtaining, from an E2 node, first information related to user equipment (UE) identity of an open (O)-RAN;

obtaining, from a network exposure function (NEF) of a 5th generation (5G) core network (5GC), second information related to the UE identity;

generating an A1 policy message based on the first information and the second information; and transmitting the A1 policy message to a near-RT RIC via an A1 interface, wherein the first information includes a general public subscription identifier (GPSI), an access and mobility management function (AMF) UE next generation application protocol identity (NGAP) ID related to the 5GC, and a globally unique AMF ID (GUAMI) related to the 5GC, and wherein the second information includes an AMF UE NGAP ID related to the 5GC and a GUAMI related to the 5GC.

2. The method of claim 1, further comprising:

storing, in a database, the first information obtained from the E2 node and the second information obtained from the NEF of the 5GC.

3. The method of claim 1, further comprising:

transmitting, to the NEF of the 5GC, the first information obtained from the E2 node, wherein the second information is generated based on the GPSI identified based on the first information.

4. The method of claim 1, wherein the first information further includes radio frequency selection priority (RFSP) value associated with a group including the UE.

5. The method of claim 1, wherein the A1 policy message includes at least one of a UE ID, a cell ID or a value of guaranteed bit rate (GBR) related to a quality of service (QoS), corresponding to a service to be applied.

6. The method of claim 1, wherein the generating the A1 policy message based on the first information and the second information comprises:

generating A1 policy message based on the GUAMI related to the 5GC and the AMF UE NGAP ID related to the 5GC, wherein the GUAMI related to the 5GC and the AMF UE NGAP ID related to the 5GC are mapped to the GPSI.

7. The method of claim 1, wherein the A1 policy message includes javascript object notation (JSON) message format.

8. A method performed by a near-real time (RT) radio access network (RAN) intelligent controller (RIC) in a wireless communication system, the method comprising:

transmitting, to a non-RT RIC, first information related to a user equipment (UE) identity obtained from an E2 node; and obtaining, from the non-RT RIC, an A1 policy message based on the first information and second information generated by a network exposure function (NEF) of a 5th generation (5G) core network (5GC), via an A1 interface, wherein the first information includes a general public subscription identifier (GPSI), an access and mobility management function (AMF) UE next generation application protocol identity (NGAP) identity (ID) related to the 5GC, and a globally unique AMF ID (GUAMI) related to the 5GC, and wherein the second information includes an AMF UE NGAP ID related to the 5GC and a GUAMI related to the 5GC.

9. The method of claim 8, further comprising:

storing, in a database, the obtained A1 policy message;

generating a RIC subscription message based on the A1 policy message; and transmitting, to the E2 node, the generated RIC subscription message.

10. The method of claim 8, wherein the second information is generated based on the GPSI identified based on the first information.

11. The method of claim 8, wherein the first information further includes radio frequency selection priority (RFSP) value associated with a group including the UE.

12. The method of claim 8, wherein the A1 policy message includes at least one of a UE ID, a cell ID or a value of guaranteed bit rate (GBR) related to a quality of service (QoS), corresponding to a service to be applied.

13. The method of claim 8, wherein the obtaining the A1 policy message based on the first information and the second information comprises:

obtaining A1 policy message based on the GUAMI related to the 5GC and the AMF UE NGAP ID related to the 5GC, wherein the GUAMI related to the 5GC and the AMF UE NGAP ID related to the 5GC are mapped to the GPSI.

14. The method of claim 8, wherein the A1 policy message includes javascript object notation (JSON) message format.

15. An apparatus for performing a non-real time (RT) radio access network (RAN) intelligent controller (RIC) in a wireless communication system, the apparatus comprising:

at least one transceiver; and at least one processor operably coupled with the at least one transceiver, wherein the at least one processor is configured to:

obtain, from an E2 node, first information related to user equipment (UE) identity of an open (O)-RAN, obtain, from a network exposure function (NEF) of a 5th generation (5G) core network (5GC), second information related to the UE identity, generate an A1 policy message based on at least the first information and the second information, and transmit the A1 policy message to a near-RT RIC via at least an A1 interface, wherein the first information includes a general public subscription identifier (GPSI), an access and mobility management function (AMF) UE next generation application protocol identity (NGAP) ID related to the 5GC and a globally unique AMF ID (GUAMI) related to the 5GC, and wherein the second information includes an AMF UE NGAP ID related to the 5GC and a GUAMI related to the 5GC.

16. The apparatus of claim 15, wherein the at least one processor is further configured to:

store, in a database, the first information obtained from the E2 node and the second information obtained from the NEF of the 5GC.

17. The apparatus of claim 15, wherein the at least one processor is further configured to:

transmit, to the NEF of the 5GC, the first information obtained from the E2 node, wherein the second information is generated based on the GPSI identified based on the first information.

18. The apparatus of claim 15, wherein the first information further includes radio frequency selection priority (RFSP) value associated with a group including the UE.

19. The apparatus of claim 15, wherein the A1 policy message includes at least one of a UE ID, a cell ID or a value of guaranteed bit rate (GBR) related to a quality of service (QoS), corresponding to a service to be applied.

20. The apparatus of claim 15, wherein, in order to generate the A1 policy message based on the first information and the second information, the at least one processor is configured to:

generate A1 policy message based on the GUAMI related to the 5GC and the AMF UE NGAP ID related to the 5GC, wherein the GUAMI related to the 5GC and the AMF UE NGAP ID related to the 5GC are mapped to the GPSI.

* * * * *